(12) United States Patent
Huang et al.

(10) Patent No.: US 12,407,479 B2
(45) Date of Patent: Sep. 2, 2025

(54) TECHNIQUES TO ENHANCE HARQ-ACK MULTIPLEXING ON PUSCH WITH REPETITIONS

(71) Applicant: QUALCOMM Incorporated, San Diego, CA (US)

(72) Inventors: Yi Huang, San Diego, CA (US); Pranay Sudeep Rungta, New York, NY (US); Peter Gaal, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 18/051,491

(22) Filed: Oct. 31, 2022

(65) Prior Publication Data

US 2023/0344604 A1 Oct. 26, 2023

Related U.S. Application Data

(60) Provisional application No. 63/363,424, filed on Apr. 22, 2022.

(51) Int. Cl.
| | |
|---|---|
| *H04L 5/00* | (2006.01) |
| *H04L 1/1812* | (2023.01) |
| *H04W 72/1268* | (2023.01) |
| *H04W 72/23* | (2023.01) |

(52) U.S. Cl.
CPC .......... *H04L 5/0055* (2013.01); *H04L 1/1812* (2013.01); *H04W 72/1268* (2013.01); *H04W 72/23* (2023.01)

(58) Field of Classification Search
CPC ............... H04L 5/0055; H04L 1/1812; H04W 72/1268; H04W 72/23
See application file for complete search history.

(56) References Cited

PUBLICATIONS

Huawei et al: "Enhancements on the scheduling of PUSCH over multiple slots", 3GPP Draft; R1-2103745, 3rd Generation Partnership Project (3GPP), Mobile Competence Centre; 650, Route Des Lucioles; F-06921 Sophia-Antipolis Cedex; France vol. RAN WG1, No. E-meeting; Apr. 12, 2021-Apr. 20, 2021 Apr. 7, 2021 . (Year: 2021).*

(Continued)

*Primary Examiner* — Brenda H Pham
(74) *Attorney, Agent, or Firm* — Procopio, Cory, Hargreaves & Savitch LLP

(57) ABSTRACT

Apparatus, methods, and computer-readable media for facilitating HARQ feedback multiplexing on PUSCH with repetitions are disclosed herein. An example method for wireless communication at a UE includes receiving an uplink grant scheduling an uplink transmission associated with a repetition quantity, the uplink grant including a bit indicator. The example method also includes transmitting a first repetition of the uplink transmission. The first repetition may include multiplexing of a quantity of HARQ-ACK feedback bits HARQ-ACK feedback for a PDSCH scheduled by a downlink grant, and the quantity of the HARQ-ACK feedback bits may be based on the bit indicator. The first repetition and the HARQ-ACK feedback may overlap in a time domain.

28 Claims, 16 Drawing Sheets

(56) References Cited

PUBLICATIONS

CATT: "Discussion on HARQ-ACK multiplexing in PUSCH without PUCCH", 3GPP Draft; R1-2201324, 3rd Generation Partnership Project (3GPP), Mobile Competence Centre; 650, Route Des Lucioles; F-06921 Sophia-Antipolis Cedex; France vol. RAN WG1, No. e-Meeting; Feb. 21, 2022-Mar. 3, 2022 Feb. 14, 2022 (Year: 2022).*
CATT: "Discussion on HARQ-ACK Multiplexing in PUSCH without PUCCH", 3GPP TSG RAN WG1 #108-e, R1-2201324, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 21, 2022-Mar. 3, 2022, 4 Pages, Feb. 14, 2022 (Feb. 14, 2022), XP052109383, pp. 1-3.
Huawei, et al., "Enhancements on the Scheduling of PUSCH Over Multiple Slots", 3GPP TSG RAN WG1 Meeting #104bis-e, R1-2103745, 3rd Generation Partnership Project (3GPP), Mobile Competence Centre, 650, Route Des Lucioles, F-06921 Sophia-Antipolis Cedex, France, vol. RAN WG1, No. E-meeting, Apr. 12, 2021-Apr. 20, 2021, 6 Pages, Apr. 7, 2021 (Apr. 7, 2021), XP052178367, pp. 3-5.
International Search Report and Written Opinion—PCT/US2023/018875—ISA/EPO—Jun. 15, 2023.
Moderator (NTT Docomo), et al., "Summary on Rel-17 TEI Related Discussion", 3GPP TSG RAN WG1 #104bis-e, R1-2103604, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, 37 Pages, Apr. 23, 2021 (Apr. 23, 2021), XP051998105, pp. 26-30.

* cited by examiner

TECHNIQUES TO ENHANCE HARQ-ACK MULTIPLEXING ON PUSCH WITH REPETITIONS

CROSS REFERENCE TO RELATED APPLICATION(S)

This application claims the benefit of and priority to U.S. Provisional Application Ser. No. 63/363,424, entitled "TECHNIQUES TO ENHANCE HARQ-ACK MULTIPLEXING ON PUSCH WITH REPETITIONS," and filed on Apr. 22, 2022, which is expressly incorporated by reference herein in its entirety.

TECHNICAL FIELD

The present disclosure relates generally to communication systems, and more particularly, to wireless communications utilizing uplink transmission grants with repetitions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. An apparatus may include a user equipment (UE). The example apparatus may receive an uplink grant scheduling an uplink transmission associated with a repetition quantity, the uplink grant including a bit indicator. The example apparatus may also transmit a first repetition of the uplink transmission, the first repetition multiplexing a quantity of Hybrid Automatic Repeat Request (HARD) acknowledgement (HARQ-ACK) feedback bits of HARQ-ACK feedback for a physical downlink shared channel (PDSCH) scheduled by a downlink grant, the first repetition and the HARQ-ACK feedback overlapping in a time domain, the quantity of the HARQ-ACK feedback bits being based on the bit indicator.

In another aspect of the disclosure, a method, a computer-readable medium, and an apparatus are provided for wireless communication. An apparatus may include a network entity, such as a base station. The example apparatus output an uplink grant scheduling an uplink transmission associated with a repetition quantity at a UE, the uplink grant including a bit indicator. The example apparatus may also obtain a first repetition of the uplink transmission, the first repetition multiplexing a quantity of HARQ-ACK feedback bits of HARQ-ACK feedback for a PDSCH scheduled by a downlink grant, the first repetition and the HARQ-ACK feedback overlapping in a time domain, the quantity of the HARQ-ACK feedback bits being based on the bit indicator.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
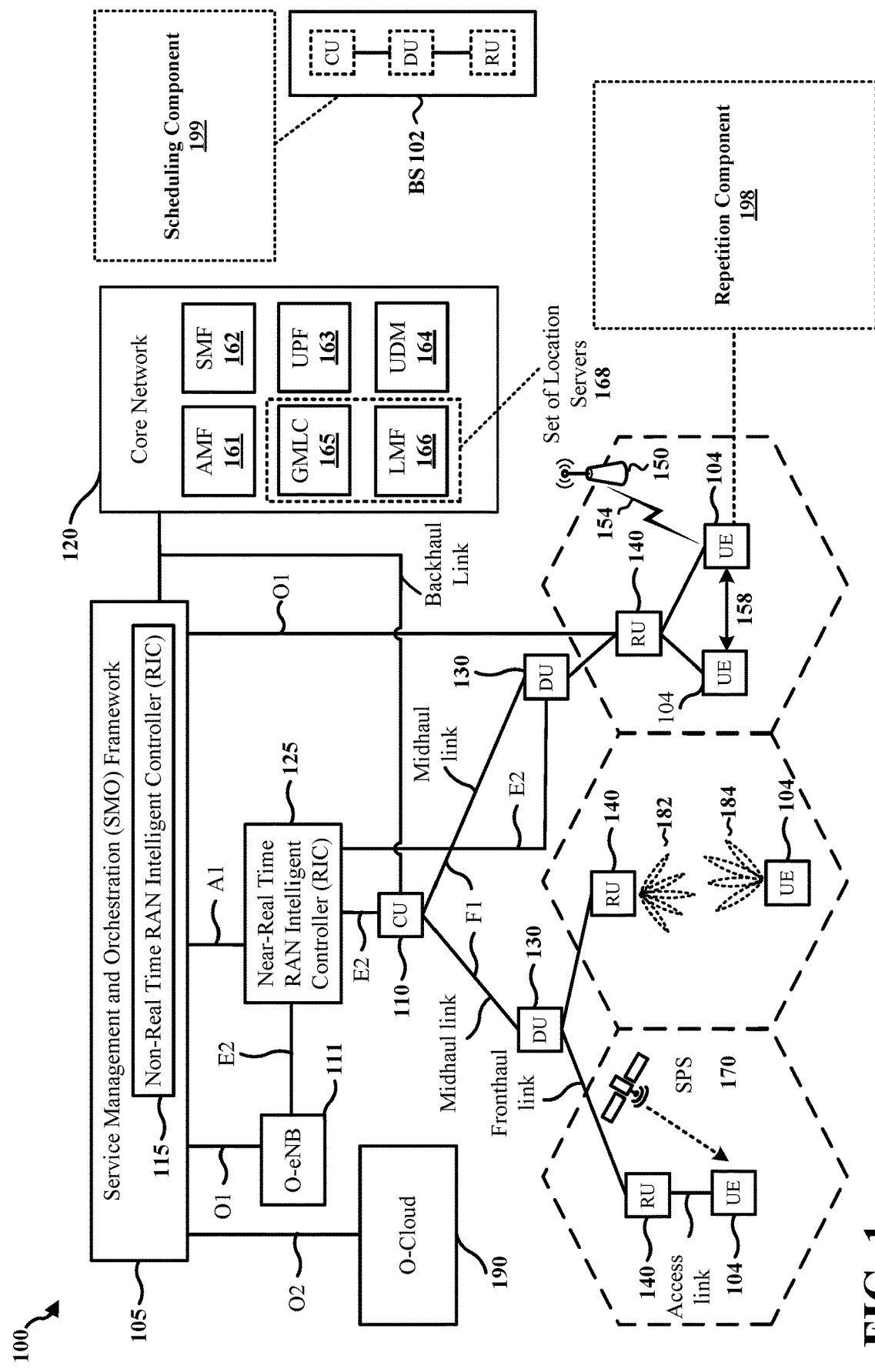
FIG. 1 is a diagram illustrating an example of a wireless communications system and an access network.

A wireless communication system may support data transmission with HARQ, for example, to improve reliability. For HARQ, a transmitter device may send an initial transmission of a message and may send one or more additional transmissions of the message, if needed, until a termination event occurs. For example, the termination event may include an indication that the message is decoded correctly by a receiver device, or a maximum quantity of transmissions of the message has occurred. After each transmission of the message, the receiver device may send an acknowledgement (ACK) if the message is decoded correctly, or a negative acknowledgement (NACK) if the message is decoded in error or missed. The transmitter device may send another transmission of the message if a NACK is received and may terminate transmission of the message if an ACK is received. As used herein, a "message" may also be referred to as a transport block, a packet, a codeword, a data block, etc.

In some examples, the transmitter device may send the one or more transmissions of the message based on scheduling information. For example, a transmitter device, such as a UE, may receive an uplink grant scheduling the UE to transmit an uplink message, such as on a PUSCH. Additionally, or alternatively, the receiver device may receive the one or more transmissions of a message based on scheduling information. For example, a receiver device, such as a UE, may receive a downlink grant scheduling the UE to receive a downlink message, such as on a PDSCH.

In some scenarios, a device may be configured to transmit a first message and to receive a second message. For example, a UE may receive a downlink grant scheduling the UE to receive a downlink message and may also receive an uplink grant scheduling the UE to transmit one or more transmissions of an uplink message. In some such examples, a repetition of the uplink message may overlap in time with transmission of the HARQ feedback associated with the downlink message.

Aspects disclosed herein provide techniques for improving HARQ feedback multiplexing on PUSCH with repetitions. The disclosed techniques may provide higher data rates, improve capacity, and/or improve spectral efficiency. For example, aspects disclosed herein may configure a UE to determine to perform multiplexing on a repetition regardless of whether the repetition overlaps in time with HARQ feedback. Additionally, the UE may perform the multiplexing based on a quantity of bits indicated by an uplink grant. By determining to perform the multiplexing based on the quantity of bits indicated by an uplink grant (e.g., a bit indicator) and regardless of whether there is an overlap in time, the UE may resolve concerns associated with missed downlink grants. In some examples, the bit indicator may include a bit indicator set including a number of bit indicators. For example, the quantity of bit indicators in the bit indicator set may correspond to a quantity of repetitions configured for an uplink message. The quantity of repetitions may be indicated via the uplink grant and/or via radio resource control (RRC) signaling. In some such examples, the UE may use a respective bit indicator of the bit indicator set to determine a quantity of z bits to multiplex on a respective repetition. In other examples, the bit indicator set may include one bit indicator that is applied to each repetition of the uplink message.

In another aspect, the UE may be configured to determine whether to perform multiplexing on a repetition based on a bit indicator included in an uplink grant. For example, when the value of the bit indicator satisfies a threshold (e.g., x bits of the bit indicator is greater than or equal to the threshold), the UE may perform multiplexing on a repetition regardless of whether the repetition overlaps in time with HARQ feedback scheduled by a downlink grant. In examples in which the value of the bit indicator does not satisfy the threshold (e.g., the x bits is less than the threshold), then the UE may multiplex the x bits of the HARQ feedback on a repetition when the repetition overlaps in time with the HARQ feedback. The UE may also skip multiplexing or multiplex zero bits on a repetition when the repetition is non-overlapping in time with the HARQ feedback.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs (e.g., a CU 110) that can communicate directly with a core network 120 via a backhaul link, or indirectly with the core network 120 through one or more disaggregated base station units (such as a Near-Real Time (Near-RT) RAN Intelligent Controller (MC) (e.g., a Near-RT MC 125) via an E2 link, or a Non-Real Time (Non-RT) MC 115 associated with a Service Management and Orchestration (SMO) Framework (e.g., an SMO Framework 105), or both). A CU 110 may communicate with one or more DUs (e.g., a DU 130) via respective midhaul links, such as an F1 interface. The DU 130 may communicate with one or more RUs (e.g., an RU 140) via respective fronthaul links. The RU 140 may communicate with respective UEs (e.g., a UE 104) via one or more radio frequency (RF) access links. In some implementations, the UE 104 may be simultaneously served by multiple RUs.

Each of the units, i.e., the CUs (e.g., a CU 110), the DUs (e.g., a DU 130), the RUs (e.g., an RU 140), as well as the Near-RT RICs (e.g., the Near-RT MC 125), the Non-RT RICs (e.g., the Non-RT MC 115), and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units.

Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU 140 can be implemented to handle over the air (OTA) communication with one or more UEs (e.g., the UE 104). In some implementations, real-time and non-real-time aspects of control and user plane communication with the RU 140 can be controlled by a corresponding DU. In some scenarios, this configuration can enable the DU(s) and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT MC 125.

In some implementations, to generate AI/ML models to be deployed in the Near-RT MC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs (e.g., the RU 140) and the UEs (e.g., the UE 104) may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UE 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs may communicate with each other using device-to-device (D2D) communication (e.g., a D2D communication link 158). The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with a UE 104 (also referred to as Wi-Fi stations (STAs)) via communication link 154, e.g., in a 5 GHz unlicensed frequency spectrum or the like. When communicating in an unlicensed frequency spectrum, the UE 104/Wi-Fi AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmission reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) (e.g., an AMF 161), a Session Management Function (SMF) (e.g., an SMF 162), a User Plane Function (UPF) (e.g., a UPF 163), a Unified Data Management (UDM) (e.g., a UDM 164), one or more location servers 168, and other functional entities. The AMF 161 is the control node that processes the signaling between the UE 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) (e.g., a GMLC 165) and a Location Management Function (LMF) (e.g., an LMF 166). However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station (e.g., the base station 102). The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TB S), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a device in communication with a network entity, such as a UE 104 in communication with a base station 102 or a component of a base station (e.g., a CU 110, a DU 130, and/or an RU 140), may be configured to manage one or more aspects of wireless communication. For example, the UE 104 may include a repetition component 198 configured to facilitate performing HARQ feedback multiplexing on PUSCH with repetitions.

In certain aspects, the repetition component 198 may be configured to receive an uplink grant scheduling an uplink transmission associated with a repetition quantity, the uplink grant including a bit indicator. The example repetition component 198 may also be configured to transmit a first repetition of the uplink transmission, the first repetition multiplexing a quantity of HARQ-ACK feedback bits of HARQ-ACK feedback for a PDSCH scheduled by a downlink grant, the first repetition and the HARQ-ACK feedback overlapping in a time domain, the quantity of the HARQ-ACK feedback bits being based on the bit indicator.

In another configuration, a network entity, such as a base station 102 or a component of a base station (e.g., a CU 110, a DU 130, and/or an RU 140), may be configured to manage or more aspects of wireless communication. For example, the base station 102 may include a scheduling component 199 configured to facilitate performing HARQ feedback multiplexing on PUSCH with repetitions.

In certain aspects, the scheduling component 199 may be configured to output an uplink grant scheduling an uplink transmission associated with a repetition quantity at a UE, the uplink grant including a bit indicator. The example scheduling component 199 may also be configured to obtain a first repetition of the uplink transmission, the first repetition multiplexing a quantity of HARQ-ACK feedback bits of HARQ-ACK feedback for a PDSCH scheduled by a downlink grant, the first repetition and the HARQ-ACK feedback overlapping in a time domain, the quantity of the HARQ-ACK feedback bits being based on the bit indicator.

Aspects disclosed herein provide techniques for improving HARQ feedback multiplexing on PUSCH with repetitions. The disclosed techniques may provide higher data rates, improve capacity and/or improve spectral efficiency.

Although the following description provides examples directed to 5G NR (and, in particular, to single uplink transmission grants with repetitions), the concepts described herein may be applicable to other similar areas, such as LTE, LTE-A, CDMA, GSM, and/or other wireless technologies, in which a UE may multiplex HARQ feedback on PUSCH with repetitions.

Figure 2:
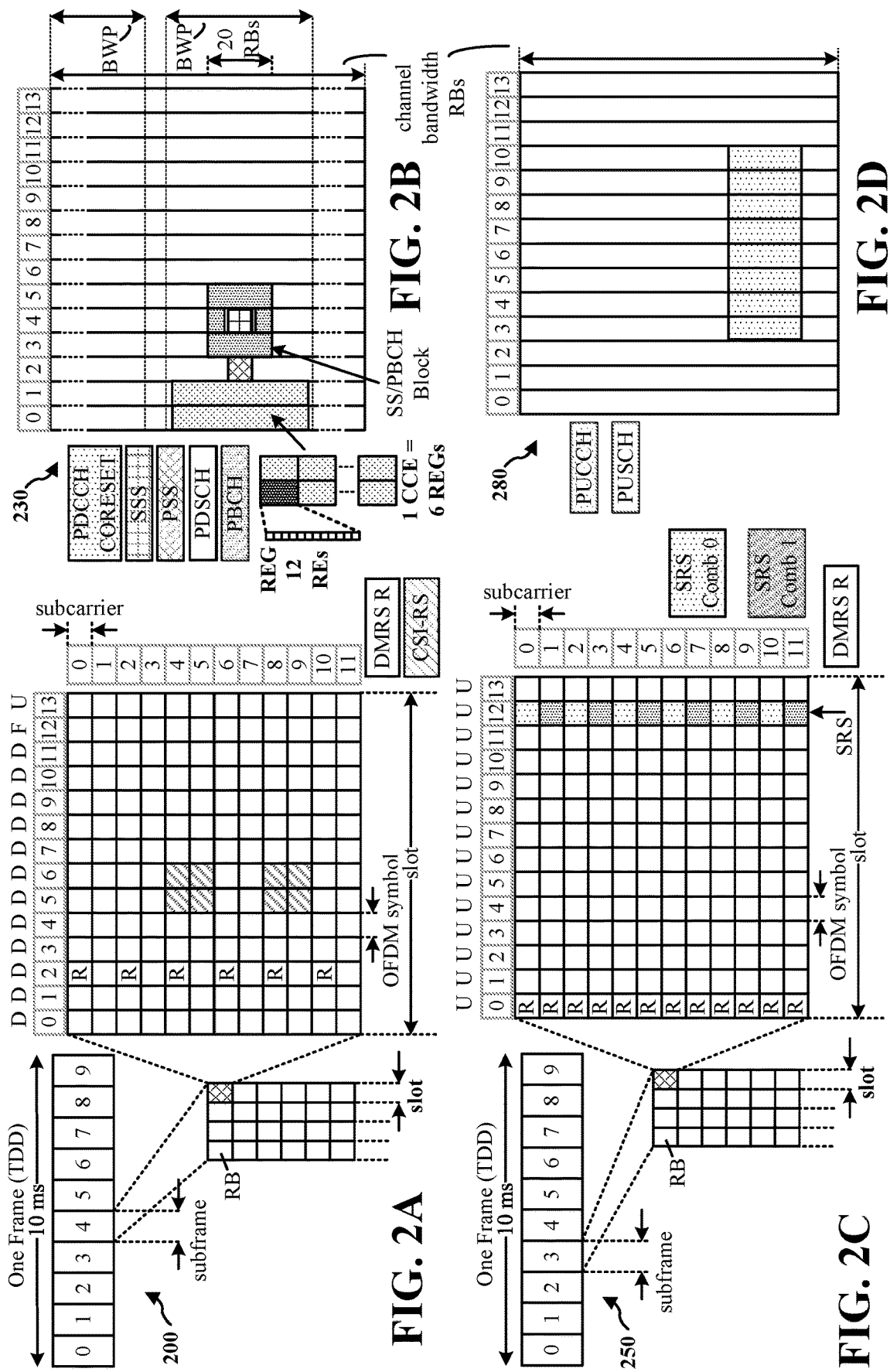
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS<br>$\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. As shown in Table 1, the subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
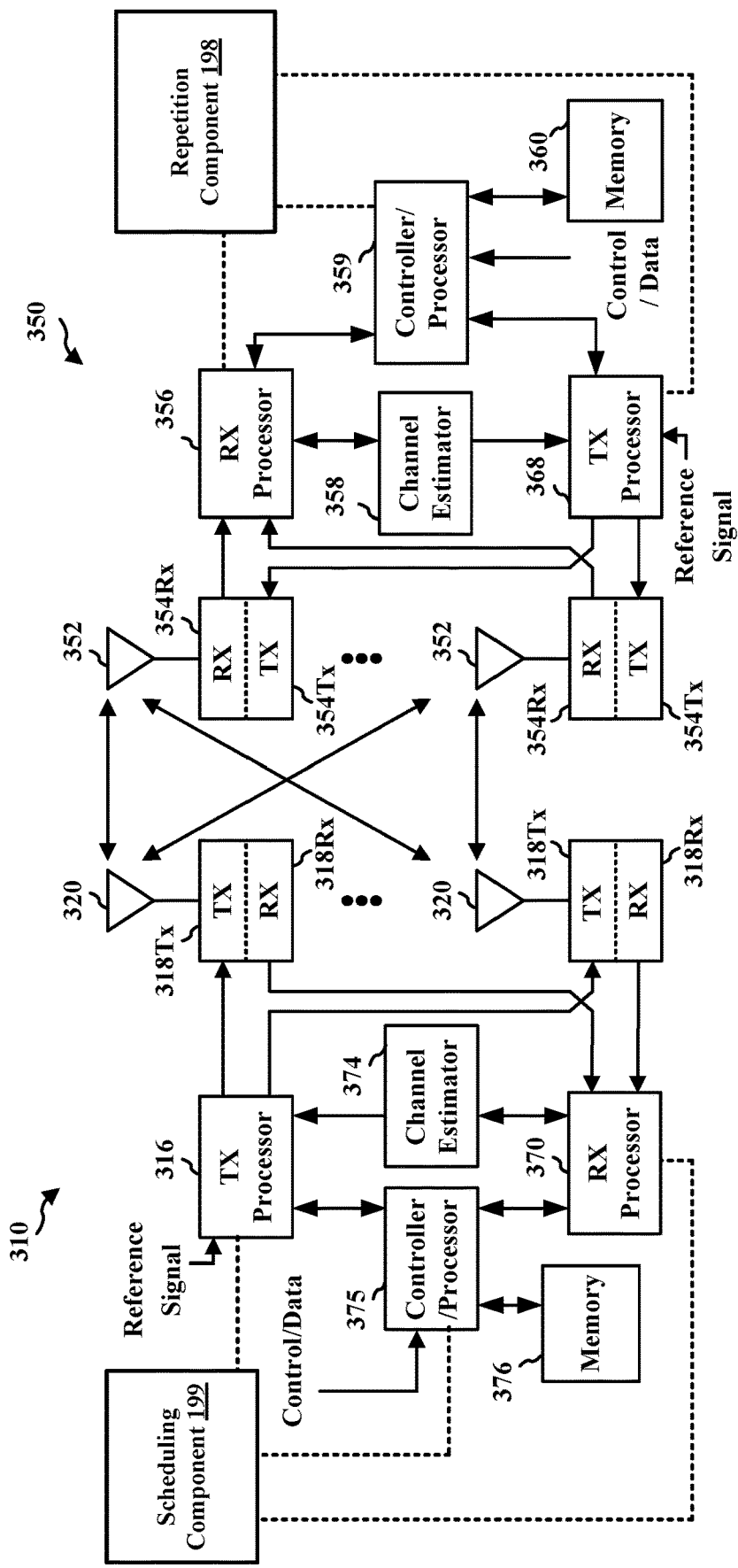
FIG. 3 is a diagram illustrating an example of a base station and user equipment (UE) in an access network.

FIG. 3 is a block diagram that illustrates an example of a first wireless device that is configured to exchange wireless communication with a second wireless device. In the illustrated example of FIG. 3, the first wireless device may include a base station 310, the second wireless device may include a UE 350, and the base station 310 may be in communication with the UE 350 in an access network. As shown in FIG. 3, the base station 310 includes a transmit processor (TX processor 316), a transmitter 318Tx, a receiver 318Rx, antennas 320, a receive processor (RX processor 370), a channel estimator 374, a controller/processor 375, and memory 376. The example UE 350 includes antennas 352, a transmitter 354Tx, a receiver 354Rx, an RX processor 356, a channel estimator 358, a controller/processor 359, memory 360, and a TX processor 368. In other examples, the base station 310 and/or the UE 350 may include additional or alternative components.

In the DL, Internet protocol (IP) packets may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna of the antennas 320 via a separate transmitter (e.g., the transmitter 318Tx). Each transmitter 318Tx may modulate a radio frequency (RF) carrier with a respective spatial stream for transmission.

At the UE 350, each receiver 354Rx receives a signal through its respective antenna of the antennas 352. Each receiver 354Rx recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, two or more of the multiple spatial streams may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna of the antennas 352 via separate transmitters (e.g., the transmitter 354Tx). Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna of the antennas 320. Each receiver 318Rx recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the repetition component 198 of FIG. 1.

At least one of the TX processor 316, the RX processor 370, and the controller/processor 375 may be configured to perform aspects in connection with the scheduling component 199 of FIG. 1.

A wireless communication system may support data transmission with HARQ, for example, to improve reliability. For HARQ, a transmitter device may send an initial transmission of a message and may send one or more additional transmissions of the message, if needed, until a termination event occurs. For example, the termination event may include an indication that the message is decoded correctly by a receiver device, or a maximum quantity of transmissions of the message has occurred. After each transmission of the message, the receiver may send an ACK, sometimes referred to as a HARQ-ACK, if the message is decoded correctly, or a NACK, sometimes referred to as a HARQ-NACK, if the message is decoded in error or missed. The transmitter device may send another transmission of the message if a NACK is received and may terminate transmission of the message if an ACK is received.

In some examples, the transmitter device may send the one or more transmissions of the message based on scheduling information. For example, a transmitter device, such as a UE, may receive an uplink grant scheduling the UE to transmit an uplink message, such as on a PUSCH. Additionally, or alternatively, the receiver device may receive the one or more transmissions of a message based on scheduling information. For example, a receiver device, such as a UE, may receive a downlink grant scheduling the UE to receive a downlink message, such as on a PDSCH.

In some scenarios, a device may be configured to transmit a first message and to receive a second message. For example, a UE may receive a downlink grant scheduling the UE to receive a downlink message and an uplink grant scheduling the UE to transmit one or more transmissions of an uplink message. In some such examples, a repetition of the uplink message may overlap in time with transmission of HARQ feedback associated with the downlink message.

Figure 4:
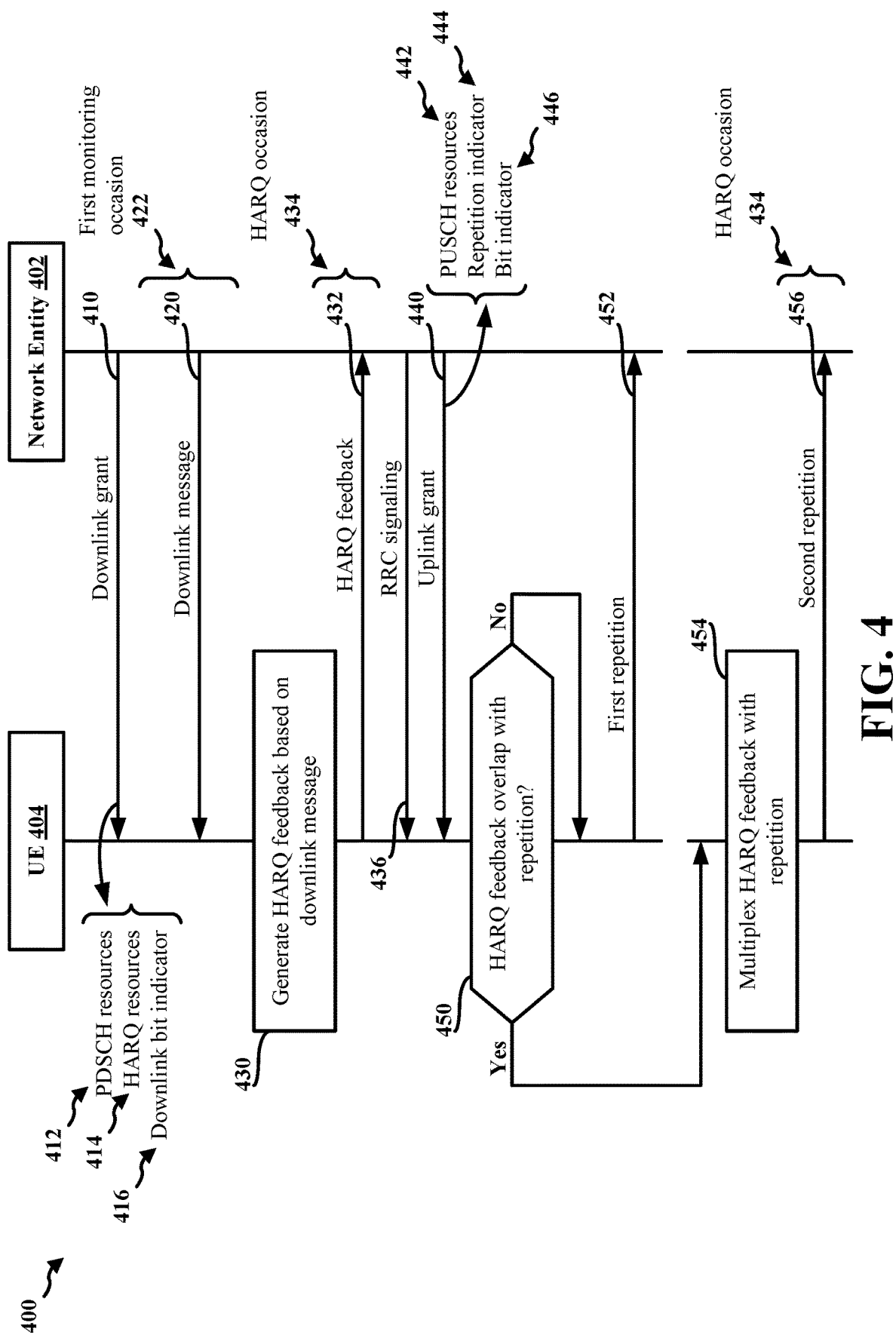
FIG. 4 illustrates an example communication flow between a base station and a UE, in accordance with the teachings disclosed herein.

FIG. 4 illustrates an example communication flow 400 between a network entity 402 and a UE 404, as presented herein. One or more aspects described for the network entity 402 may be performed by a component of a base station, such as a CU, a DU, and/or an RU. In the illustrated example, the communication flow 400 facilitates the UE 404 performing HARQ feedback multiplexing on PUSCH with repetitions. Aspects of the network entity 402 may be implemented by the base station 102 of FIG. 1 and/or the base station 310 of FIG. 3. Aspects of the UE 404 may be implemented by the UE 104 of FIG. 1 and/or the UE 350 of FIG. 3. Although not shown in the illustrated example of FIG. 4, in additional or alternative examples, the network entity 402 and/or the UE 404 may be in communication with one or more other base stations or UEs.

As shown in FIG. 4, the network entity 402 may transmit a downlink grant 410 that is received by the UE 404. The network entity 402 may transmit the downlink grant 410 on a PDCCH. The downlink grant 410 may include information related to a downlink message 420, such as PDSCH resources 412 allocated for monitoring occasions associated with one or more transmissions of a downlink message 420. The downlink grant 410 may also include information related to HARQ feedback 432 (e.g., an ACK or a NACK) for the downlink message 420. For example, the downlink grant 410 may indicate HARQ resources 414 allocated to the UE 404 for transmitting the HARQ feedback 432, and include a downlink bit indicator 416 indicating a quantity of ACK/NACK bits allocated for the HARQ feedback 432. In some aspects, the downlink bit indicator 416 may include a downlink assignment index (DAI) that may be used to facilitate determination of the quantity of bits for the HARQ feedback 432.

The network entity 402 may transmit the downlink message 420 that is received by the UE 404. The network entity 402 may transmit the downlink message 420 on a PDSCH. The UE 404 may receive the downlink message 420 based on the PDSCH resources 412 indicated by the downlink grant 410. For example, the PDSCH resources 412 may indicate a first monitoring occasion 422 and the UE 404 may monitor resources associated with the first monitoring occasion 422 to receive the downlink message 420. The first monitoring occasion 422 may be associated with time resources and/or frequency resources.

In the example of FIG. 4, the UE 404 may perform a generation procedure 430 to generate the HARQ feedback 432 based on the downlink message 420. For example, the UE 404 may generate uplink control information (UCI) with an ACK or a NACK based on if the UE 404 decodes the downlink message 420 at the first monitoring occasion 422.

As shown in FIG. 4, the UE 404 may transmit the HARQ feedback 432 associated with the downlink message 420. The UE 404 may use resources allocated by the downlink grant 410 for the HARQ feedback 432. For example, the HARQ resources 414 may indicate time resources and/or frequency resources associated with a HARQ occasion 434. The UE 404 may transmit the HARQ feedback 432 based on the HARQ occasion 434. Additionally, a payload size of the HARQ feedback 432 may be based on the downlink bit indicator 416 of the downlink grant 410. The UE 404 may transmit the HARQ feedback 432 using UCI on a physical uplink control channel (PUCCH).

In the example of FIG. 4, the UE 404 may also be configured to transmit an uplink message that is received by the network entity 402. For example, the network entity 402 may transmit an uplink grant 440 that is received by the UE 404. The network entity 402 may transmit the uplink grant 440 on a PDCCH. The uplink grant 440 may include information related to the uplink message, such as PUSCH resources 442 (e.g., time resources and/or frequency resources) allocated to the UE 404 for transmission of the uplink message. The uplink grant 440 may also include a repetition indicator 444 indicating a quantity of repetitions of the uplink message. For example, based on the uplink grant 440, the UE 404 may determine to transmit k repetitions of the uplink message, may determine a first resource allocated to the initial transmission of the uplink message, and may determine subsequent resources allocated for the k−1 repetitions of the uplink message. As described above, the UE 404 may transmit up to k repetitions of the uplink message until a termination event occurs.

Although the example of FIG. 4 includes the repetition indicator 444 with the uplink grant 440, in other examples, the UE 404 may receive the repetition indicator 444 via RRC signaling. For example, the network entity 402 may transmit RRC signaling 436 that is received by the UE 404. The RRC signaling 436 may include the repetition indicator 444 indicating a quantity of repetitions of the uplink message.

In some examples, a repetition of the uplink message may coincide (e.g., overlap) in time with transmission of HARQ feedback. In examples in which an uplink message repetition and HARQ feedback overlap, the UE 404 may multiplex the HARQ feedback with the repetition. The UE 404 may perform a determination procedure 450 to determine whether UCI carrying the HARQ feedback 432 overlaps with a repetition of the uplink message. For example, the UE 404 may determine that a first repetition 452 of the uplink message is non-overlapping with the HARQ occasion 434. In such examples, the UE 404 may transmit the first repetition 452 of the uplink message that is received by the network entity 402. The UE 404 may transmit the first repetition 452 while skipping multiplexing on the first repetition 452 or by multiplexing zero bits on the first repetition 452. The UE 404 may transmit the first repetition 452 on a PUSCH.

In examples in which an uplink message repetition overlaps with HARQ feedback, the UE 404 may multiplex the HARQ feedback and the repetition. For example, when performing the determination procedure 450, the UE 404 may determine that a second repetition 456 is overlapping in time with the HARQ occasion 434. In such examples, the UE 404 may perform a multiplexing procedure 454 to multiplex the HARQ feedback 432 with the repetition (e.g., the second repetition 456).

In some examples, the UE 404 may multiplex x bits of the HARQ feedback 432 with the second repetition 456. The UE 404 may receive a quantity of bits of the HARQ feedback 432 to multiplex with the second repetition 456 via the uplink grant 440. For example, the uplink grant 440 may include a bit indicator 446 indicating a quantity of bits (e.g., x bits) to multiplex. In such examples, when the UE 404 determines that an uplink message repetition and HARQ feedback are overlapping in time, the UE 404 may multiplex the x bits, indicated by the bit indicator 446, of the HARQ feedback 432 with the second repetition 456. In some aspects, the bit indicator 446 may correspond to a total DAI (TDAI) that may be used to facilitate determination of the quantity of bits of the HARQ feedback 432 to multiplex. The TDAI may be referred to as a "UL-TDAI" or by any other name.

In examples in which the bit indicator 446 indicates a quantity of bits that is less than or equal to a threshold, the UE 404 may puncture x bits of the repetition. In examples in which the bit indicator 446 indicates a quantity of bits that is greater than the threshold, the UE 404 may multiplex the HARQ feedback 432 by rate-matching the respective repetition of the uplink message.

As shown in FIG. 4, the UE 404 may transmit the second repetition 456 of the uplink message that is received by the network entity 402. The UE 404 may transmit the second repetition 456 on a PUSCH. The second repetition 456 may be a repetition of the uplink message multiplexed by x bits of the HARQ feedback 432.

Figure 5:
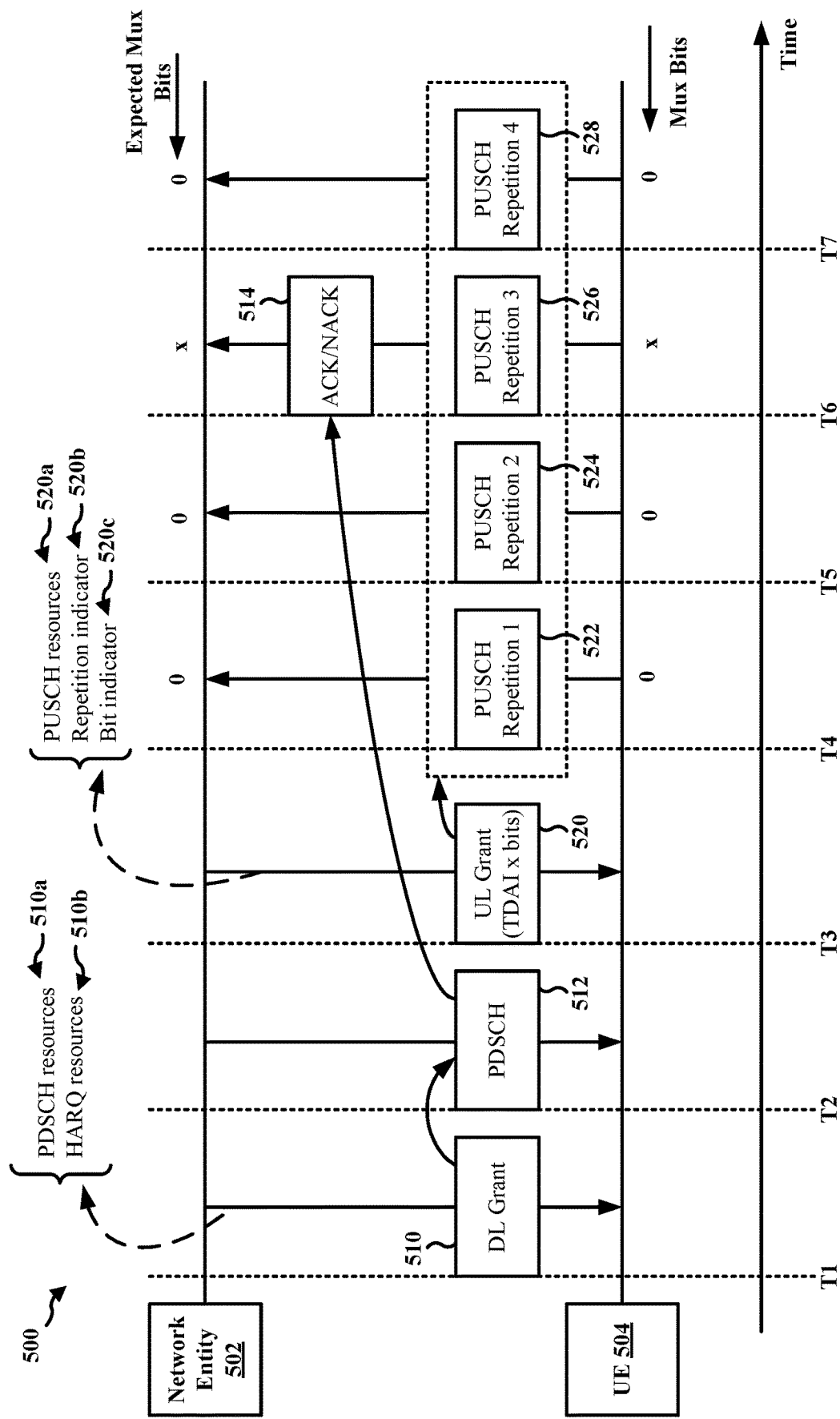
FIG. 5 is a diagram illustrating a timeline of a UE performing hybrid automatic retransmission (HARQ) feedback multiplexing on a physical uplink shared channel (PUSCH) with repetitions, in accordance with the teachings disclosed herein.

FIG. 5 is a diagram illustrating a timeline 500 of a UE 504 performing HARQ feedback multiplexing on PUSCH with repetitions, as presented herein. In the illustrated example of FIG. 5, the UE 504 may receive scheduling information for a downlink message and for an uplink message from a network entity 502. Aspects of the network entity 502 may be implemented by the network entity 402 of FIG. 4. Aspects of the UE 504 may be implemented by the UE 404 of FIG. 4.

In the illustrated example of FIG. 5, the UE 504 may receive a downlink grant 510 from the network entity 502 at time T1. Aspects of the downlink grant 510 may be implemented by the downlink grant 410 of FIG. 4. The downlink grant 510 may provide information for receiving a PDSCH 512. Aspects of the PDSCH 512 may be implemented by the downlink message 420 of FIG. 4. The downlink grant 510 may include PDSCH resources 510a, such as the PDSCH resources 412, that indicate a monitoring occasion associated with time T2. The downlink grant 510 may also indicate HARQ resources 510b, such as the HARQ resources 414, that indicate a HARQ occasion for the UE 504 to transmit HARQ feedback 514 associated with the PDSCH 512. For example, the downlink grant 510 may include HARQ resources indicating a HARQ occasion at time T6. The HARQ feedback 514 may include an ACK when the UE 504 decodes the PDSCH 512 and may otherwise include a NACK.

As shown in FIG. 5, the UE 504 may receive an uplink grant 520 from the network entity 502 at time T3. Aspects of the uplink grant 520 may be implemented by the uplink grant 440 of FIG. 4. For example, the uplink grant 520 may indicate PUSCH resources 520a, such as the PUSCH resources 442, a repetition indicator 520b, such as the repetition indicator 444, and a bit indicator 520c, such as the bit indicator 446. In the example of FIG. 5, the repetition indicator 520b may indicate that the UE 504 is to transmit four repetitions of the uplink message. For example, and based on the PUSCH resources 520a of the uplink grant 520, the UE 504 may determine to transmit a first repetition 522 ("PUSCH Repetition 1") at time T4, transmit a second repetition 524 ("PUSCH Repetition 2") at time T5, transmit a third repetition 526 ("PUSCH Repetition 3") at time T6, and transmit a fourth repetition 528 ("PUSCH Repetition 4") at time T7.

In the example of FIG. 5, the UE 504 may use the bit indicator 520c of an uplink grant 520 to multiplex x bits on a repetition when HARQ feedback scheduled by a downlink grant overlaps with the respective repetition. For example, based on the HARQ occasion associated with the HARQ feedback 514 and the PUSCH resources 520a associated with the repetitions of the uplink message, the UE 504 may determine that the first repetition 522, the second repetition 524, and the fourth repetition 528 are non-overlapping in time with the HARQ occasion. In such examples, the UE 504 may transmit the respective repetitions without multiplexing, as described in connection with the determination procedure 450 and the first repetition 452 of FIG. 4.

In examples in which the UE 504 determines that a HARQ occasion and a repetition are overlapping in time (e.g., the third repetition 526 and the HARQ occasion associated with the HARQ feedback 514 at time T6), the UE 504 may multiplex x bits of the HARQ feedback 514 on the respective repetition, as described in connection with the multiplexing procedure 454 and the second repetition 456 of FIG. 4. For example, the uplink grant 520 includes the bit indicator 520c ("TDAI") indicating a quantity of x bits to multiplex. In such examples, the UE 504 may multiplex x bits of the HARQ feedback 514 with the third repetition 526. As described above, multiplexing the x bits of the HARQ feedback 514 with the third repetition 526 may include puncturing x bits of the third repetition 526 or rate-matching the third repetition 526.

The network entity 502 may receive the repetitions of the uplink message based on expected multiplexing of bits for each repetition. For example, in the example of FIG. 5, the UE 504 may multiplex {0, 0, x, 0} bits for the respective repetitions of the uplink message. Since the network entity 502 may schedule the HARQ occasion associated with the HARQ feedback 514 and the repetitions of the uplink message, the network entity 502 may perform demultiplexing of each repetition based on a determination that the first repetition 522, the second repetition 524, and the fourth repetition 528 are non-overlapping with a HARQ occasion and that the third repetition 526 is overlapping with the HARQ occasion. That is, based on the scheduled transmissions of the repetitions and the HARQ occasion, the network entity 502 may determine that the third repetition 526 is a multiplexed repetition and that the remaining repetitions are non-multiplexed repetitions. Additionally, since the network entity 502 provides the bit indicator 520c with the uplink grant 520 (e.g., the TDAI x bits), the network entity 502 has the ability to determine that x bits of the HARQ feedback 514 are multiplexed with the third repetition 526. That is, to receive the repetitions of the uplink message, the network entity 502 may apply {0, 0, x, 0} demultiplexing bits for the respective repetitions of the uplink message.

In the example of FIG. 5, the UE 504 is configured with one HARQ occasion at time T6 and is provided one bit indicator (e.g., the bit indicator 520c of the uplink grant 520) that the UE 504 uses to determine how many bits of the HARQ feedback 514 to multiplex when the HARQ occasion overlaps in time with a repetition. In some examples, the UE may be configured with multiple HARQ occasions for different respective downlink grants. Additionally, one or more of the HARQ occasions may overlap in time with respective repetitions of an uplink message.

Figure 6A:
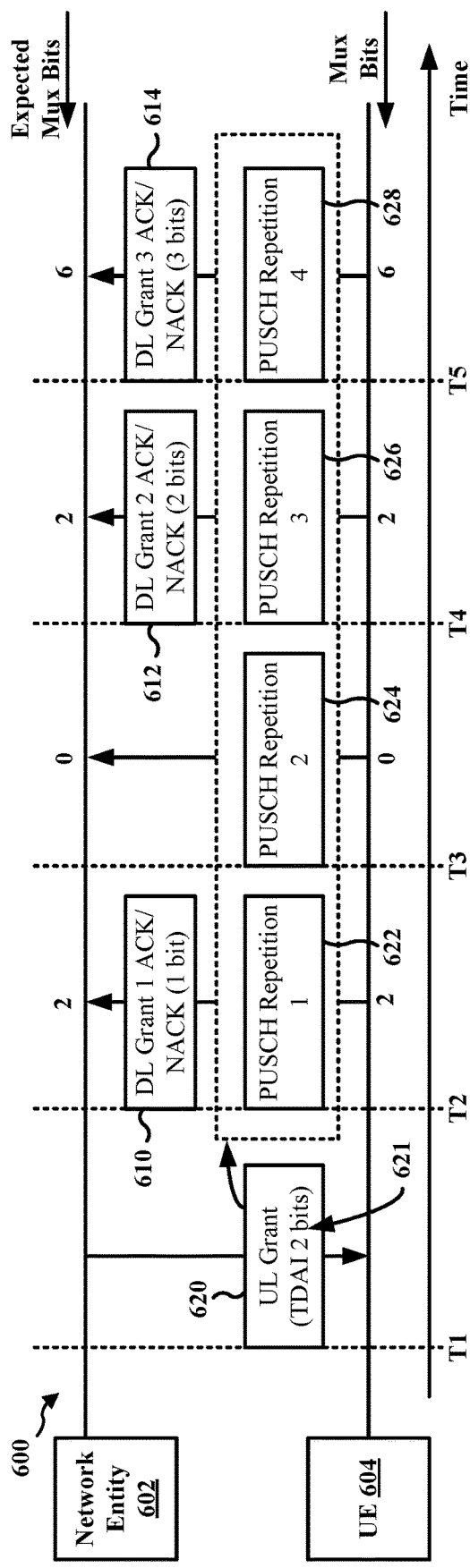
FIG. 6A is a diagram illustrating a timeline of a UE performing HARQ feedback multiplexing on PUSCH with repetitions based on scheduling information from a base station, in accordance with the teachings disclosed herein.
Figure 6B:
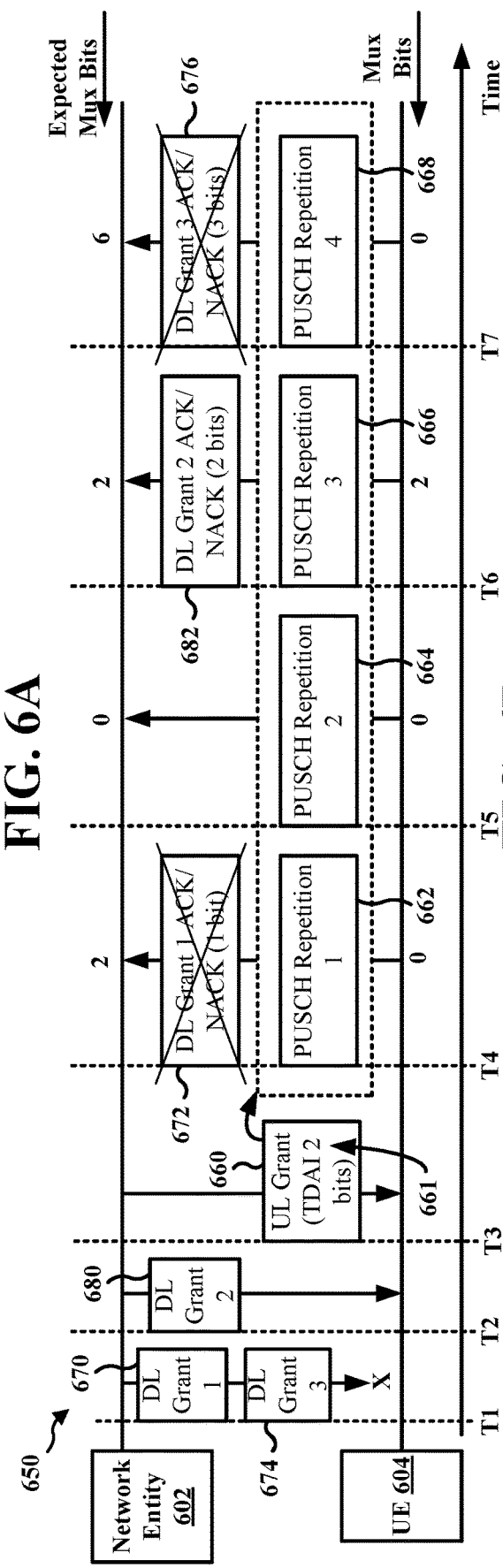
FIG. 6B is a diagram illustrating a timeline of the UE performing HARQ feedback multiplexing on PUSCH with repetitions based on scheduling information from the base station, in accordance with the teachings disclosed herein.

FIG. 6A and FIG. 6B are diagrams illustrating respective timelines of performing HARQ feedback multiplexing on PUSCH with repetitions.

FIG. 6A is a diagram illustrating a timeline 600 of a UE 604 performing HARQ feedback multiplexing on PUSCH with repetitions based on scheduling information from a network entity 602, as presented herein. In the illustrated example of FIG. 6A, the UE 604 may receive scheduling information for multiple downlink messages and for an uplink message from the network entity 602. Aspects of the network entity 602 may be implemented by the network entity 402 of FIG. 4. Aspects of the UE 604 may be implemented by the UE 404 of FIG. 4.

In the illustrated example of FIG. 6A, the network entity 602 may transmit three downlink grants that are received by the UE 604. The three downlink grants may schedule three downlink messages and three HARQ occasions for transmitting respective HARQ feedback. For example, and as shown in FIG. 6A, the UE 604 may be configured with a first HARQ occasion at time T2 for transmitting first HARQ feedback 610 ("DL Grant 1 ACK/NACK"), a second HARQ occasion at time T4 for transmitting second HARQ feedback 612 ("DL Grant 2 ACK/NACK"), and a third HARQ occasion at time T5 for transmitting third HARQ feedback 614 ("DL Grant 3 ACK/NACK"). Although not shown in the example of FIG. 6A, it may be appreciated that the first HARQ feedback 610 is associated with a first downlink message at a first monitoring occasion, as described in connection with the HARQ feedback 514 and the PDSCH 512 of FIG. 5. In a similar manner, the second HARQ feedback 612 may be associated with a second downlink message at a second monitoring occasion and the third HARQ feedback 614 may be associated with a third downlink message at a third monitoring occasion.

Similar to the example of FIG. 5, the UE 604 of FIG. 6A may receive an uplink grant 620 from the network entity 602 at time T1. In the illustrated example of FIG. 6A, the UE 604 determines to schedule a quantity of repetitions of an uplink message at respective times based on the repetition indicator and the PUSCH resources of the uplink grant 620. For example, the UE 604 may schedule four repetitions of an uplink message. In the example of FIG. 6A, the UE 604 may schedule a first repetition 622 ("PUSCH Repetition 1") at time T2, a second repetition 624 ("PUSCH Repetition 2") at time T3, a third repetition 626 ("PUSCH Repetition 3") at time T4, and a fourth repetition 628 ("PUSCH Repetition 4") at time T5 based on the uplink grant 620.

In the example of FIG. 6A, the uplink grant 620 includes a bit indicator 621 ("TDAI") indicating to multiplex 2 bits when an overlap in time occurs between a HARQ occasion scheduled by a downlink grant and a repetition. Additionally, each of the downlink grants associated with the first HARQ feedback 610, the second HARQ feedback 612, and the third HARQ feedback 614 includes a respective downlink bit indicator indicating a payload size of each respective HARQ feedback. For example, the payload size of the first HARQ feedback 610 is one bit, the payload size of the second HARQ feedback 612 is two bits, and the payload size of the third HARQ feedback 614 is three bits.

In the example of FIG. 6A, when a PUSCH repetition is non-overlapping with HARQ feedback scheduled by a downlink grant, the UE 604 disregards the bit indicator 621 of the uplink grant 620 and multiplexes 0 bits on the PUSCH repetition. For example, the UE 604 may multiplex 0 bits on the second repetition 624 at time T3.

In examples in which a PUSCH repetition is overlapping with HARQ feedback scheduled by a downlink grant, the UE 604 may multiplex z bits on the PUSCH repetition. The value of the z bits may be determined based on a relationship between the bit indicator 621 of the uplink grant 620 (e.g., the x bits) and the downlink bit indicator of each downlink grant associated with respective HARQ feedback (e.g., the y bit payload size of each HARQ feedback).

For example, the UE 604 may use Equation 1 (below) to determine the z bits.

$$z = 4T + x \text{ bits, where } T = 0, 1, 2, \ldots \qquad \text{Equation 1:}$$

In Equation 1, the term z represents the quantity of bits to multiplex on the PUSCH repetition, the term x represents the value of the bit indicator 621, and the term T represents a modifier. The value of the modifier T may be determined as the smallest integer that satisfies Equation 2 (below).

$$\text{ceil}(4T + x \geq y), \text{ where } T = 0, 1, 2, \ldots \qquad \text{Equation 2:}$$

In Equation 2, the term x represents the value of the bit indicator 621, the term y represents the payload size of the HARQ feedback, and the term T represents a modifier. The UE 604 may determine the value of the modifier T as the smallest integer that satisfies Equation 2. In examples in which the value of the bit indicator 621 (e.g., x bits) is greater than or equal to the value of the downlink bit indicator (e.g., y bits) of a HARQ feedback (e.g., x bits≥y bits), the value of the modifier T is zero and then Equation 1 may be simplified and the UE 604 may use Equation 3 (below) to determine value of the z bits.

$$z = x \text{ bits} \quad \text{Equation 3:}$$

That is, when the value of the bit indicator 621 (e.g., x bits) is greater than or equal to the value of the downlink bit indicator (e.g., y bits) of a HARQ feedback (e.g., x bits≥y bits), the UE 604 uses the x bits indicated by the bit indicator 621 to multiplex on the PUSCH repetition. For example, with respect to the first repetition 622 and the first HARQ feedback 610, the 2 bits indicated by the bit indicator 621 is greater than the 1 bit payload size of the first HARQ feedback 610 and, thus, the UE 604 multiplexes two bits on the first repetition 622 at time T2. In a similar manner, and with respect to the third repetition 626 and the second HARQ feedback 612, the 2 bits indicated by the bit indicator 621 is equal to the 2 bits payload size of the second HARQ feedback 612 and, thus, the UE 604 multiplexes two bits on the second repetition 624 at time T4. It may be appreciated that when the value of the bit indicator 621 is greater than the value of the downlink bit indicator of a HARQ feedback, the UE 604 may use one or more dummy bits when multiplexing, such as adding one dummy bit when multiplexing on the first repetition 622 at time T2. Examples of a dummy bit include a NACK indicator.

In examples in which the value of the bit indicator 621 is less than the value of the downlink bit indicator of a HARQ feedback (e.g., x bits<y bits), then the UE 604 first uses Equation 2 (above) to determine the value of the term T and then uses Equation 1 (above) to determine the value of the z bits. For example, and with respect to the fourth repetition 628 (e.g., x is 2 bits) and the third HARQ feedback 614 (e.g., y payload size is 3 bits) at time T5, the value of the modifier T is one.

$$\text{ceil } (4T + (2) \geq (3)) \quad \text{Equation 2}$$
$$\text{ceil } (4T \geq 1)$$
$$\text{ceil}\left(T \geq \frac{1}{4}\right)$$
$$T = 1$$

Using the value of the modifier T as one, the UE 604 may use Equation 1 to determine the value of the z bits. For example, using Equation 1, the UE 604 may determine the value of z bits is 6 bits.

$$z = 4(1) + (2)$$

$$z = 6 \quad \text{Equation 1:}$$

That is, with respect to the transmission at time T5, the UE 604 may multiplex six bits on the fourth repetition 628. Similar to the example of the transmission at time T2, the UE 604 may add dummy bits when the z bits is greater than the payload size of the respective HARQ feedback. For example, the UE 604 may add three dummy bits (e.g., three NACK indicators) to the three bits of the third HARQ feedback 614 to satisfy multiplexing the six bits on the fourth repetition 628.

Thus, as shown in FIG. 6A, the UE 604 may multiplex {2, 0, 2, 6} bits for the repetitions of the uplink message at times T2, T3, T4, and T5, respectively. Additionally, the network entity 602 may expect the repetitions of the uplink message to be multiplexed with expected multiplexing bits {2, 0, 2, 6} bits. The network entity 602 may use the expected multiplexing bits to demultiplex the respective repetitions, as described in connection with the example of FIG. 5.

FIG. 6B is a diagram illustrating a timeline 650 of the UE 604 performing HARQ feedback multiplexing on PUSCH with repetitions based on scheduling information from the network entity 602, as presented herein. Similar to the example of FIG. 6A, the network entity 602 may transmit scheduling information for multiple downlink messages and for an uplink message to the UE 604. For example, the network entity 602 may transmit an uplink grant 660 that is received by the UE 604 at time T3. Based on the uplink grant 660, the UE 604 may schedule four repetitions of an uplink message. For example, the UE 604 may schedule a first repetition 662 ("PUSCH Repetition 1") at time T4, a second repetition 664 ("PUSCH Repetition 2") at time T5, a third repetition 666 ("PUSCH Repetition 3") at time T6, and a fourth repetition 668 ("PUSCH Repetition 4") at time T7.

In the example of FIG. 6B, the network entity 602 transmits a first downlink grant 670 and a third downlink grant 674 at time T1. The first downlink grant 670 schedules first HARQ feedback 672 at time T4 and the third downlink grant 674 schedules third HARQ feedback 676 at time T7. The network entity 602 also transmits a second downlink grant 680 at time T2. The second downlink grant 680 schedules second HARQ feedback 682 at time T7. Although the example of FIG. 6B illustrates the first downlink grant 670 and the third downlink grant 674 being transmitted at a same time (e.g., at time T1), in other examples, the first downlink grant 670 and the third downlink grant 674 may be transmitted by the network entity 602 at different times.

In the example of FIG. 6B, the UE 604 receives the second downlink grant 680 at time T2 and, thus, is scheduled to transmit the second HARQ feedback 682 at time T6. However, in the example of FIG. 6B, the UE 604 does not receive the first downlink grant 670 and the third downlink grant 674 at time T1 and, thus, is not scheduled to transmit the first HARQ feedback 672 at time T4 and the third HARQ feedback 676 at time T7, respectively.

Similar to the example of FIG. 6A, the uplink grant 660 includes a bit indicator 661 indicating 2 bits (e.g., TDAI is 2 bits), and the payload size associated with the HARQ feedbacks of FIG. 6B are the same as the respective HARQ feedbacks of FIG. 6A. That is, the payload size of the first HARQ feedback 672 is one bit, the payload size of the second HARQ feedback 682 is two bits, and the payload size of the third HARQ feedback 676 is three bits.

As described above, when a repetition is non-overlapping in time with a HARQ feedback scheduled by a downlink grant, the UE transmits the repetition without multiplexing or by multiplexing zero bits. For example, with respect to time T5, the UE 604 may determine that there is no overlap between the second repetition 664 and HARQ feedback and, thus, may transmit the second repetition 664 without multiplexing or by multiplexing zero bits. Additionally, the network entity 602 expects no multiplexing at time T5 with the second repetition 664 and, thus, expects zero multiplexing bits at time T5.

Similar to the example of FIG. 6A, the UE 604 of FIG. 6B may determine to multiplex two bits for the transmission at time T6 based on the second HARQ feedback 682 overlapping in time with the third repetition 666. Additionally, the network entity 602 expects the transmission at time T6 to be multiplexed with two bits.

As shown in FIG. 6B, the UE 604 does not receive the first downlink grant 670 and the third downlink grant 674. The UE 604 may not receive a downlink grant, for example, due to bad channel conditions or the downlink channel associated with the downlink grant being an unreliable channel. In such scenarios, the UE 604 is also not scheduled with the HARQ occasions associated with the first HARQ feedback 672 and the third HARQ feedback 676. For example, since the UE 604 does not receive the first downlink grant 670, the UE 604 does not receive the PDSCH resources associated with the corresponding downlink message and also does not receive the HARQ resources associated with the first HARQ feedback 672.

Accordingly, the UE 604 determines that the first repetition 662 and the fourth repetition 668 are non-overlapping in time with HARQ feedback scheduled by downlink grants. Thus, the UE 604 may transmit the first repetition 662 at time T4 and the fourth repetition 668 at time T7 without multiplexing or by multiplexing zero bits.

However, in contrast to the example of the second repetition 664 at time T5, the network entity 602 is expecting an overlap in time between the first repetition 662 and the first HARQ feedback 672 at time T4 and an overlap in time between the fourth repetition 668 and the third HARQ feedback 676 at time T7. Thus, the network entity 602 expects the transmission at time T4 to be multiplexed with two bits and the transmission at time T7 to be multiplexed with six bits, as described in connection with the transmission at time T2 and the transmission at time T5, respectively, of FIG. 6A.

As shown in the examples of FIG. 6A and FIG. 6B, the UE 604 may determine whether to perform multiplexing or skip multiplexing on a repetition based on successfully receiving a downlink grant scheduling HARQ feedback. For example, in the example of FIG. 6B, the UE 604 misses the first downlink grant 670 and the third downlink grant 674 and, thus, determines not to perform multiplexing on the repetitions at time T4 and time T7. However, the network entity 602 may be unaware that the UE 604 missed the respective downlink grants and expects the respective repetitions to be multiplexed. For example, in the example of FIG. 6B, the UE 604 may multiplex {0, 0, 2, 0} bits for the repetitions of the uplink message at times T4, T5, T6, and T7, respectively. Additionally, the network entity 602 may expect the repetitions of the uplink message to be multiplexed with expected multiplexing bits {2, 0, 2, 6} bits. When the multiplexed bits and the expected multiplexed bits are not the same, as shown in FIG. 6B, the network entity 602 may be unable to decode the repetitions and HARQ feedback for the misaligned transmissions.

Additionally, in examples in which the UE 604 determines to perform multiplexing on a repetition, the UE 604 may receive a common bit indicator in the uplink grant that may be applied to each repetition. For example, in the example of FIG. 6A, the UE 604 uses the value of the bit indicator 621 to determine how many bits to multiplex on the first repetition 622 at time T2, the third repetition 626 at time T4, and the fourth repetition 628 at time T5. However, in some such examples, when determining the z bits to multiplex, the UE 604 may determine to add one or more dummy bits for multiplexing. For example, with respect to the transmission at time T5 of FIG. 6A, the UE 604 determines to multiplex six bits, but the payload size of the third HARQ feedback 614 is three bits and, thus, the UE 604 adds three dummy bits.

Aspects disclosed herein provide techniques for improving HARQ feedback multiplexing on PUSCH with repetitions. The disclosed techniques may provide higher data rates, improve capacity and/or improve spectral efficiency. For example, aspects disclosed herein may configure the UE to determine to perform multiplexing on a repetition regardless of whether the repetition overlaps in time with HARQ feedback. Additionally, the UE may perform the multiplexing based on a quantity of bits indicated by an uplink grant. By determining to perform the multiplexing based on the quantity of bits indicated by an uplink grant (e.g., the bit indicator) and regardless of whether there is an overlap in time, the UE may resolve concerns associated with missed downlink grants, as described in connection with the example of FIG. 6B. In some examples, the bit indicator may include a bit indicator set including a number of bit indicators. For example, the quantity of bit indicators in the bit indicator set may correspond to the quantity of repetitions configured for an uplink message. The quantity of repetitions may be indicated via the uplink grant and/or via RRC signaling. In some such examples, the UE may use a respective bit indicator of the bit indicator set to determine a quantity of z bits to multiplex on a respective repetition. In other examples, the bit indicator set may include one bit indicator that is applied to each repetition of the uplink message.

In another aspect, the UE may be configured to determine whether to perform multiplexing on a repetition based on a bit indicator included in an uplink grant. For example, when the value of the bit indicator satisfies a threshold (e.g., the x bits indicated by the bit indicator is greater than or equal to the threshold), the UE may perform multiplexing on a repetition regardless of whether the repetition overlaps in time with HARQ feedback scheduled by a downlink grant. In examples in which the value of the bit indicator does not satisfy the threshold (e.g., the x bits is less than the threshold), then the UE may multiplex the x bits of the HARQ feedback on a repetition when the repetition overlaps in time with the HARQ feedback. The UE may also skip multiplexing or multiplex zero bits on a repetition when the repetition is non-overlapping in time with the HARQ feedback.

Figure 7:
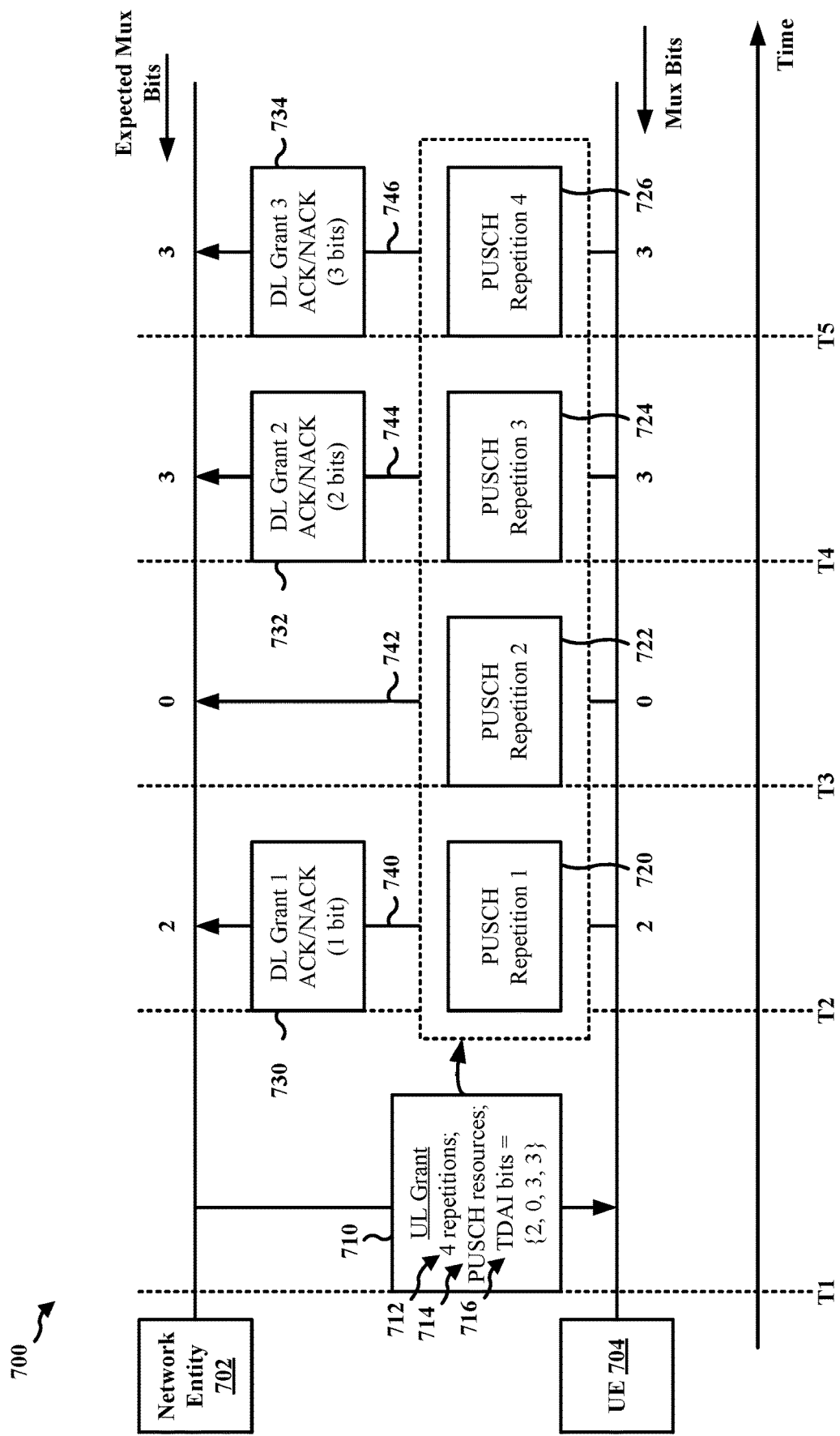
FIG. 7 is a diagram illustrating a timeline of a UE performing HARQ feedback multiplexing on PUSCH with repetitions based on scheduling information from a base station, in accordance with the teachings disclosed herein.

FIG. 7 is a diagram illustrating a timeline 700 of a UE 704 performing HARQ feedback multiplexing on PUSCH with repetitions based on scheduling information from a network entity 702, as presented herein. One or more aspects described for the network entity 702 may be performed by a component of a base station or a network entity, such as a CU, a DU, and/or an RU. Aspects of the network entity 702 may be implemented by the base station 102 of FIG. 1 and/or the base station 310 of FIG. 3. Aspects of the UE 704 may be implemented by the UE 104 of FIG. 1 and/or the UE 350 of FIG. 3.

Although not shown in the example of FIG. 7, the network entity 702 may transmit downlink grants that are received by the UE 704. The network entity 702 may transmit the downlink grants on PDCCH. The downlink grants may schedule respective HARQ occasions for transmitting HARQ feedback. For example, the UE 704 may be configured to transmit first HARQ feedback 730 ("DL Grant 1 ACK/NACK") with a payload size of one bit at time T2, may be configured to transmit second HARQ feedback 732 ("DL Grant 2 ACK/NACK") with a payload size of two bits at time T3, and may be configured to transmit third HARQ feedback 734 ("DL Grant 3 ACK/NACK") with a payload size of three bits at time T5.

In the example of FIG. 7, the network entity 702 transmits an uplink grant 710 that is received by the UE 704 at time T1. The uplink grant 710 may include a single uplink transmission grant with repetitions. For example, the uplink grant 710 may schedule k repetitions of an uplink message. In the example of FIG. 7, the uplink grant 710 includes a repetition indicator 712 indicating to transmit four repetitions of an uplink message. The uplink grant 710 also includes PUSCH resources 714 indicating time resources and/or frequency resources associated with transmitting each of the repetitions of the uplink message. For example, the PUSCH resources 714 may allocate resources to transmit a first repetition 720 ("PUSCH Repetition 1") at time T2, resources to transmit a second repetition 722 ("PUSCH Repetition 2") at time T3, resources to transmit a third repetition 724 ("PUSCH Repetition 3") at time T4, and resources to transmit a fourth repetition 726 ("PUSCH Repetition 4") at time T5.

The uplink grant 710 also includes a bit indicator, such as the bit indicator 446 of FIG. 4. In the example of FIG. 7, the bit indicator includes a bit indicator set 716 including a number of bit indicators. For example, the bit indicator set 716 of FIG. 7 includes a number of bit indicators that is the same as the k repetitions indicated by the repetition indicator 712 (e.g., 4 bit indicators). Each of the different bit indicators of the bit indicator set 716 may be associated with a respective repetition. For example, the bit indicator set 716 of FIG. 7 includes a set of four bit indicators {2, 0, 3, 3}, and where a first bit indicator "2" is associated with the first repetition 720, a second bit indicator "0" is associated with the second repetition 722, a third bit indicator "3" is associated with the third repetition 724, and a fourth bit indicator "3" is associated with the fourth repetition 726. Aspects of the bit indicator may be implemented by an UL-TDAI parameter. In some examples, the UL-TDAI parameter may include N fields corresponding to the number of bit indicators included in the bit indicator set 716.

In the example of FIG. 7, the UE 704 is configured to multiplex a bit indicator of the bit indicator set 716 with a respective repetition of the uplink message. The UE 704 multiplexes a quantity of bits indicated by a bit indicator regardless of whether the respective repetition is overlapping in time with HARQ feedback. For example, based on the first bit indicator of the bit indicator set 716, the UE 704 multiplexes 2 bits of the first HARQ feedback 730 on the first repetition 720. That is, the UE 704 may transmit a first transmission 740 at time T2 including two bits of the first HARQ feedback 730 multiplexed on the first repetition 720. In a similar manner, the UE 704 may transmit a second transmission 742 at time T3 that includes zero bits multiplexed with the second repetition 722 based on the second bit indicator "0" of the bit indicator set 716, may transmit a third transmission 744 at time T4 that includes three bits of the second HARQ feedback 732 multiplexed with the third repetition 724 based on the third bit indicator "3" of the bit indicator set 716, and may transmit a fourth transmission 746 at time T5 that includes three bits of the third HARQ feedback 734 multiplexed with the fourth repetition 726 based on the fourth bit indicator "3" of the bit indicator set 716.

As shown in FIG. 7, by receiving the bit indicator set 716 with a number of bit indicators corresponding to the k repetitions of the uplink message, the UE 704 may skip determining whether to perform HARQ feedback multiplexing on a PUSCH repetition based on a downlink grant that may or may not be missed. Thus, as shown in FIG. 7, the UE 704 may multiplex {2, 0, 3, 3} bits for the repetitions of the uplink message at times T2, T3, T4, and T5, respectively. Additionally, the network entity 702 may expect the repetitions of the uplink message are multiplexed with expected multiplexing {2, 0, 3, 3} bits. The network entity 702 may use the respective expected multiplexing bits to demultiplex the corresponding transmissions and to recover the respective repetition and the respective HARQ feedback, if any, as described in connection with the example of FIG. 5.

In the illustrated example of FIG. 7, the UE 704 may use the value of the bit indicator to determine the number of bits to multiplex for a respective repetition. However, in examples in which a downlink grant indicates a payload size of corresponding HARQ feedback, the UE 704 may use Equation 1 (above) and Equation 2 (above) to determine the z bits to multiplex. For example, if the fourth bit indicator of the bit indicator set 716 was "2" bits, then the fourth transmission 746 would include six bits of the third HARQ feedback 734 multiplexed with the fourth repetition 726 based on the fourth bit indicator "2" of the bit indicator set 716, as described in connection with the transmission at time T5 of FIG. 6A. In such examples, the UE 704 may include one or more dummy bits to satisfy multiplexing the z bits.

It may be appreciated that since the network entity 702 may provide the scheduling information for the downlink grant and the uplink grant, the network entity 702 may configure the bit indicators of the bit indicator set 716 so that each respective bit indicator is at least equal to the payload size of a corresponding HARQ feedback.

The example of FIG. 7 helps alleviate concerns with HARQ feedback multiplexing on PUSCH repetitions when a downlink grant is missed, for example, which may cause a misalignment between the number of bits multiplexed by the UE and the expected number of multiplexed bits multiplexed at the base station. However, the example bit indicator set 716 includes overhead associated with each bit indicator of the bit indicator set 716. For example, with four repetitions of an uplink message, the uplink grant also provides four bit indicators to use with respective repetitions. That is, the cost of employing the bit indicator set 716 is the increased overhead of the downlink control channel (e.g., DCI on a PDCCH) due to the N bit indicators included in the bit indicator set 716.

Figure 8:
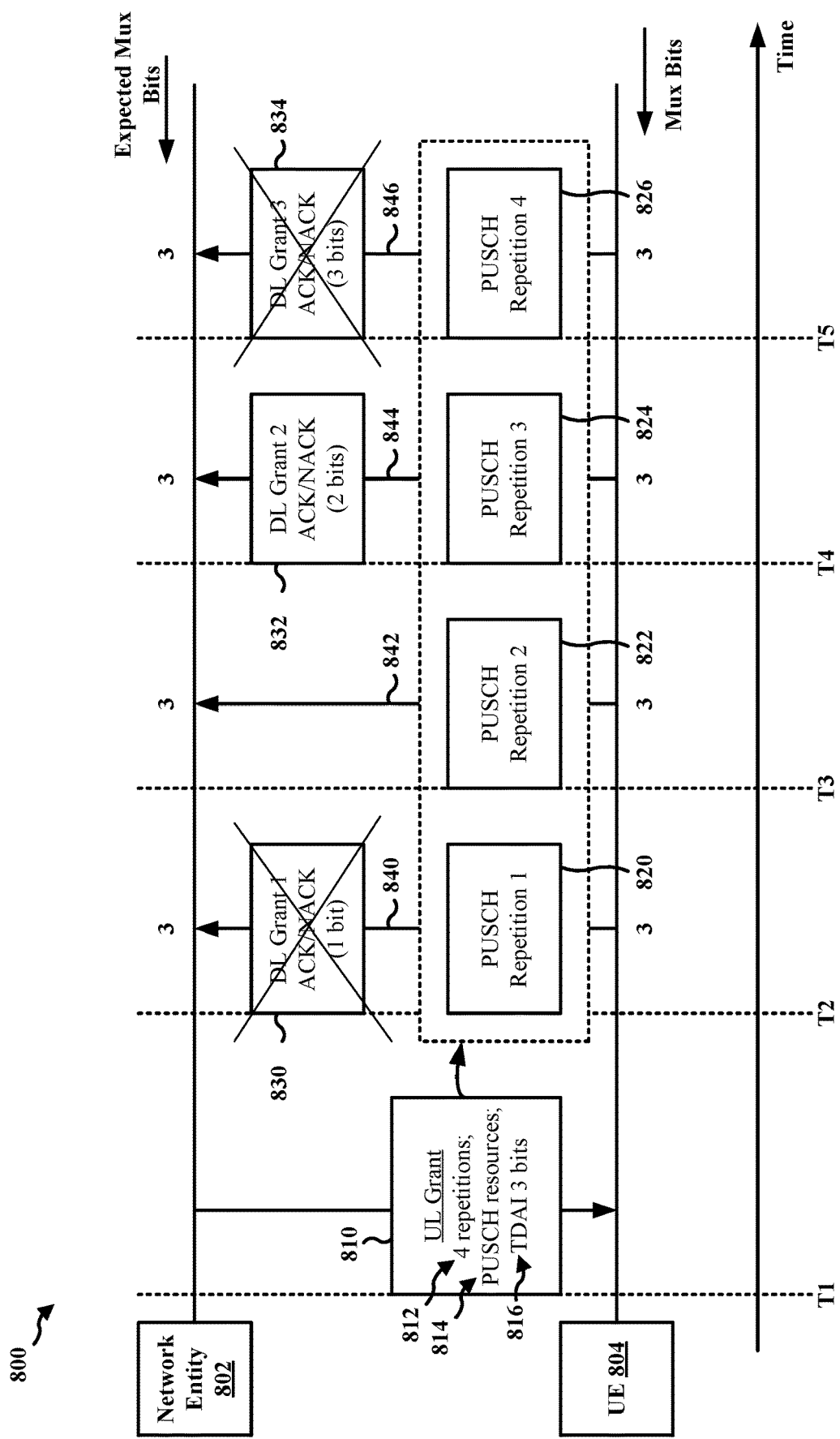
FIG. 8 is a diagram illustrating a timeline of a UE performing HARQ feedback multiplexing on PUSCH with repetitions based on scheduling information from a base station, in accordance with the teachings disclosed herein.

FIG. 8 is a diagram illustrating a timeline 800 of a UE 804 performing HARQ feedback multiplexing on PUSCH with repetitions based on scheduling information from a network entity 802, as presented herein. One or more aspects described for the network entity 802 may be performed by a component of a base station or a network entity, such as a CU, a DU, and/or an RU. Aspects of the network entity 802 may be implemented by the base station 102 of FIG. 1 and/or the base station 310 of FIG. 3. Aspects of the UE 804 may be implemented by the UE 104 of FIG. 1 and/or the UE 350 of FIG. 3. Although not shown in the example of FIG. 8, the network entity 802 may transmit downlink grants that may be received by the UE 804 or may be missed by the UE 804, as described in connection with the example of FIG. 6B. The network entity 802 may transmit the downlink grants on PDCCH. The downlink grants may schedule respective HARQ occasions for transmitting HARQ feedback.

Similar to the example of FIG. 6B, the UE 804 may miss receiving a first downlink grant, may receive a second downlink grant, and may miss receiving a third downlink grant. Based on the three downlink grants transmitted by the network entity 802, the network entity 802 may expect to receive first HARQ feedback 830 ("DL Grant 1 ACK/NACK") with a payload size of one bit at time T2, may expect to receive second HARQ feedback 832 ("DL Grant 2 ACK/NACK") with a payload size of two bits at time T3, and may expect to receive third HARQ feedback 834 ("DL Grant 3 ACK/NACK") with a payload size of three bits at time T5. However, based on the downlink grants received by the UE 804 (e.g., the second downlink grant), the UE 804 may determine a HARQ occasion for transmitting the second HARQ feedback 832 at time T4.

In the example of FIG. 8, the network entity 802 transmits an uplink grant 810 that is received by the UE 804 at time T1. The uplink grant 810 may include a single uplink transmission grant with repetitions. For example, the uplink grant 810 may schedule k repetitions of an uplink message. In the example of FIG. 8, the uplink grant 810 includes a repetition indicator 812 indicating a quantity of four repetitions associated with an uplink message. The uplink grant 810 also includes PUSCH resources 814 indicating time resources and/or frequency resources associated with transmitting each of the repetitions of the uplink message. For example, the PUSCH resources 814 may allocate resources to transmit a first repetition 820 ("PUSCH Repetition 1") at time T2, resources to transmit a second repetition 822 ("PUSCH Repetition 2") at time T3, resources to transmit a third repetition 824 ("PUSCH Repetition 3") at time T4, and resources to transmit a fourth repetition 826 ("PUSCH Repetition 4") at time T5.

Although the example of FIG. 8 includes the repetition indicator 812 with the uplink grant 810, in other examples, the UE 804 may receive the repetition indicator 812 via RRC signaling, such as the example RRC signaling 436 of FIG. 4.

The uplink grant 710 also includes a bit indicator 816. In the example of FIG. 8, the bit indicator 816 is a common bit indicator indicating a quantity of x bits to multiplex on repetitions. In the example of FIG. 8, the bit indicator 816 indicates to multiplex three bits on repetitions. Aspects of the bit indicator may be implemented by an UL-TDAI parameter or a common UL-TDAI parameter.

In the example of FIG. 8, the UE 804 is configured to multiplex the x bits on repetitions regardless of whether the repetition is overlapping in time with HARQ feedback. It may be appreciated that by multiplexing the x bits regardless of whether a repetition is overlapping in time with HARQ feedback, the example techniques resolve concerns associated with missed downlink grants.

For example, based on the three bits indicated by the bit indicator 816, the UE 804 multiplexes three bits on the first repetition 820. That is, the UE 804 may transmit a first transmission 840 at time T2 including three multiplexed bits on the first repetition 820. In a similar manner, the UE 804 may transmit a second transmission 842 at time T3 that includes three bits multiplexed with the second repetition 822, may transmit a third transmission 844 at time T4 that includes three bits of the second HARQ feedback 832 multiplexed with the third repetition 824, and may transmit a fourth transmission 846 at time T5 that includes three bits multiplexed with the fourth repetition 826. In examples in which the x bits indicated by the bit indicator 816 is greater than the payload size of a HARQ feedback, the UE 804 may add one or more dummy bits, such as one or more NACK indicators, so that each transmission includes x bits multiplexed on a respective repetition. In examples in which a downlink grant is missed and, thus, the UE 804 is not scheduled with a corresponding HARQ occasion (e.g., at time T2 with the missed HARQ occasion associated with the first HARQ feedback 830 and at time T5 with the missed HARQ occasion associated with the third HARQ feedback 834), or when a repetition is non-overlapping in time with HARQ feedback (e.g., at time T3), the x bits that the UE 804 multiplexes with each respective repetition may be one or more dummy bits (e.g., one or more NACK indicators).

Thus, as shown in FIG. 8, the UE 804 may multiplex {3, 3, 3, 3} bits for the repetitions of the uplink message at times T2, T3, T4, and T5, respectively. Additionally, the network entity 802 may expect the repetitions of the uplink message to be multiplexed with expected multiplexing {3, 3, 3, 3} bits. As described above, the network entity 802 may use the respective expected multiplexing bits to demultiplex the corresponding transmissions and to recover the respective repetition and the respective HARQ feedback, if any, as described in connection with the examples of FIG. 5.

In the illustrated example of FIG. 8, the UE 804 uses the value of the bit indicator 816 to determine the number of bits to multiplex for a repetition. However, in examples in which a downlink grant indicates a payload size of corresponding HARQ feedback, the UE 804 may use Equation 1 (above) and Equation 2 (above) to determine the z bits to multiplex. For example, if the bit indicator of the uplink grant 810 of FIG. 8 was "2" bits, then the UE 804 may multiplex six bits of the third HARQ feedback 834 with the fourth repetition 826 when transmitting the fourth transmission 846, as described in connection with the transmission at time T5 of FIG. 6A. In such examples, the UE 804 may include one or more dummy bits to satisfy multiplexing the z bits.

The example of FIG. 8 improves HARQ feedback multiplexing on PUSCH repetitions when a downlink grant is missed, for example, which may cause a misalignment between the number of bits multiplexed by the UE and the expected number of multiplexed bits multiplexed at the base station. Additionally, the bit indicator 816 is common (e.g., shared) for each repetition, which reduces overhead associated with adding multiple bit indicators to a bit indicator set, as described in connection with the example of FIG. 7.

Figure 9:
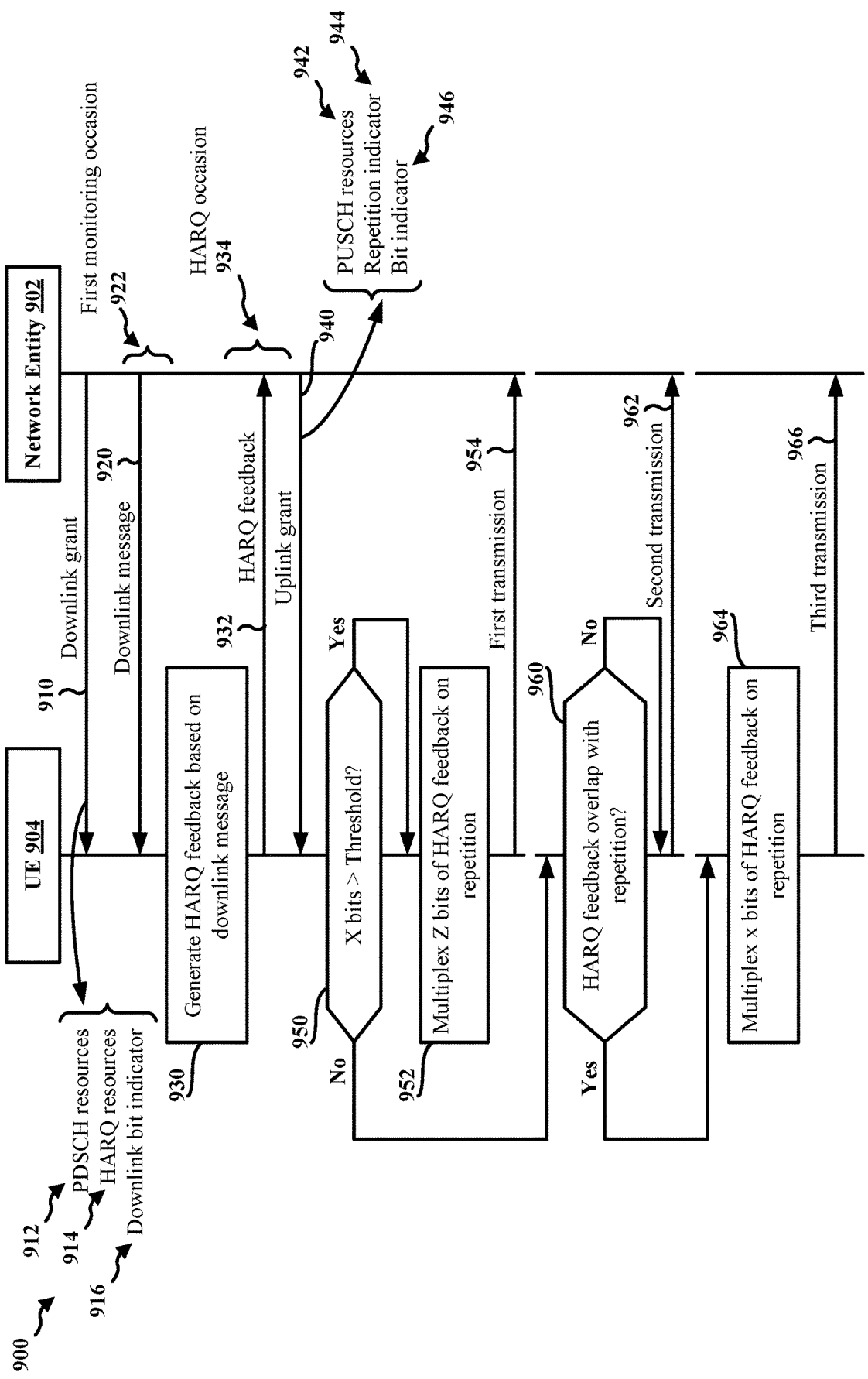
FIG. 9 illustrates an example communication flow between a base station and a UE, in accordance with the teachings disclosed herein.

FIG. 9 illustrates an example communication flow 900 between a network entity 902 and a UE 904, as presented herein. One or more aspects described for the network entity 902 may be performed by a component of a base station or a network entity, such as a CU, a DU, and/or an RU. Aspects of the network entity 902 may be implemented by the base station 102 of FIG. 1 and/or the base station 310 of FIG. 3. Aspects of the UE 904 may be implemented by the UE 104 of FIG. 1 and/or the UE 350 of FIG. 3. Although not shown in the illustrated example of FIG. 9, in additional or alternative examples, the network entity 902 and/or the UE 904 may be in communication with one or more other base stations or UEs.

In the illustrated example, the communication flow 900 facilitates the UE 904 performing HARQ feedback multiplexing on PUSCH with repetitions. For example, the UE 904 may be configured to determine whether to perform multiplexing on a repetition based on a bit indicator included in an uplink grant. In some examples, the UE 904 may perform multiplexing on a repetition regardless of whether the repetition overlaps in time with HARQ feedback when the value of the bit indicator satisfies a threshold (e.g., the x bits is greater than or equal to the threshold), In examples in which the value of the bit indicator does not satisfy the threshold (e.g., the x bits is less than the threshold), then the UE may multiplex the x bits on a repetition when the repetition overlaps in time with HARQ feedback. The UE may also skip multiplexing or multiplex zero bits on a repetition when the repetition is non-overlapping in time with HARQ feedback As shown in FIG. 9, the network entity 902 may transmit a downlink grant 910 that is received by the UE 904. The network entity 902 may transmit the downlink grant 910 in DCI on a PDCCH. Aspects of the downlink grant 910 may be similar to the downlink grant 410 of FIG. 4. For example, the downlink grant 910 may include information related to a downlink message 920 and HARQ feedback 932 associated with the downlink message 920, such as PDSCH resources 912 allocated for monitoring occasions associated with one or more transmissions of the downlink message 920, HARQ resources 914 allocated to the UE 904 for transmitting the HARQ feedback 932, and a downlink bit indicator 916 indicating a quantity of ACK/NACK bits for the HARQ feedback. In some aspects, the downlink bit indicator 916 may include a TDAI that may be used to facilitate determination of the quantity of bits for the HARQ feedback 932.

The network entity 902 may transmit the downlink message 920 that is received by the UE 904. The network entity 902 may transmit the downlink message 920 on a PDSCH. Aspects of the downlink message 920 may be similar to the downlink message 420 of FIG. 4. The UE 904 may receive the downlink message 920 based on the PDSCH resources 912 indicated by the downlink grant 910. For example, the PDSCH resources 912 may indicate a first monitoring occasion 922 and the UE 904 may monitor resources associated with the first monitoring occasion 922 to receive the downlink message 920. The first monitoring occasion 922 may be associated with time resources and/or frequency resources.

The UE 904 may perform a generation procedure 930 to generate the HARQ feedback 932 based on the downlink message 920. For example, the UE 904 may generate UCI with an ACK or a NACK based on if the UE 904 decoded the downlink message 920 at the first monitoring occasion 922. Aspects of the HARQ feedback 932 may be similar to the HARQ feedback 432 of FIG. 4.

As shown in FIG. 9, the UE 904 may transmit the HARQ feedback 932 associated with the downlink message 920. The UE 904 may use resources allocated by the downlink grant 910 for the HARQ feedback 932. For example, the HARQ resources 914 may indicate time resources and/or frequency resources associated with a HARQ occasion 934. The UE 904 may transmit the HARQ feedback 932 based on the HARQ occasion 934. Additionally, a payload size of the HARQ feedback 932 may be based on the downlink bit indicator 916 of the downlink grant 910. The UE 904 may transmit the HARQ feedback 932 using UCI on a PUCCH.

As shown in FIG. 9, the UE 904 may also be configured to transmit an uplink message that is received by the network entity 902. For example, the network entity 902 may transmit an uplink grant 940 that is received by the UE 904. The network entity 902 may transmit the uplink grant 940 on a PDCCH. Aspects of the uplink grant 940 may be similar to the uplink grant 440 of FIG. 4. For example, the uplink grant 940 may include information related to the uplink message, such as PUSCH resources 942 allocated to the UE 904 for transmission of the uplink message, a repetition indicator 944 indicating a quantity of repetitions of the uplink message, and a bit indicator 946 indicating a quantity of bits (e.g., x bits) to multiplex with a repetition of the uplink message. In some aspects, the bit indicator 946 may correspond to a TDAI that may be used to facilitate determination of the quantity of bits of the HARQ feedback 932 to multiplex. As described above, the UE 904 may transmit up to k repetitions of the uplink message until a termination event occurs.

Although the example of FIG. 9 includes the repetition indicator 944 with the uplink grant 940, in other examples, the UE 904 may receive the repetition indicator 944 via RRC signaling, such as the example RRC signaling 436 of FIG. 4.

In an aspect, the UE 904 may improve HARQ feedback multiplexing on PUSCH with repetitions based on a value of the bit indicator 946 of the uplink grant 940. For example, the UE 904 may determine if the x bits indicated by the bit indicator 946 is greater than a threshold quantity of bits. In some examples, the threshold quantity of bits may be two bits. For example, when the x bits is less than or equal to two bits, then the UE 904 may multiplex the x bits on a repetition by puncturing the x bits of the repetition. The network entity 902 may have the capability to decode a transmission that includes a repetition with zero bits, one bit, or two bits punctured. However, when the x bits is greater than the threshold (e.g., greater than two bits), then the UE 904 multiplexes the x bits by rate-matching the repetition. The network entity 902 may have difficulty attempting to decode a transmission that includes rate-matching when the quantity of multiplexed bits (e.g., at the UE 904) is different than the quantity of expected multiplexed bits (e.g., at the network entity 902).

In the example of FIG. 9, the UE 904 may perform a determination procedure 950 to determine if the x bits indicated by the bit indicator 946 is greater than a threshold quantity of bit (e.g., is x bits>2 bits?). If the UE 904 determines that the x bits is greater than the threshold quantity, then, the UE 904 performs a multiplexing procedure 952 to multiplex z bits on a repetition. The UE 904 may use Equation 1, Equation 2, and/or Equation 3 (reproduced below) to determine the value of the z bits.

$$z = 4T + x \text{ bits, where } T = 0, 1, 2, \ldots \qquad \text{Equation 1:}$$

$$\text{ceil}(4T + x \geq y), \text{ where } T = 0, 1, 2, \ldots \qquad \text{Equation 2:}$$

$$z = x \text{ bits} \qquad \text{Equation 3:}$$

As shown in FIG. 9, the UE 904 may transmit a first transmission 954 that is received by the network entity 902. The UE 904 may transmit the first transmission 954 on a PUSCH. The first transmission 954 may include multiplexing of z bits on a repetition. The UE 904 may multiplex the z bits regardless of whether the repetition overlaps in time with HARQ feedback. By multiplexing the z bits regardless of the overlapping status of the repetition, the multiplexing does not depend on whether HARQ feedback scheduled by a downlink grant is overlapping. Thus, in scenarios in which a downlink grant is missed by the UE 904, for example, as described in connection with the timeline 650 of FIG. 6B and/or the timeline 800 of FIG. 8, the quantity of multiplexed bits (e.g., at the UE 904) is aligned with the quantity of expected multiplexed bits (e.g., at the network entity 902) and, thus, the network entity 902 may decode the first transmission 954 to receive the repetition and the HARQ feedback, if any.

If the UE 904 determines, via the determination procedure 950, that the x bits dose not satisfy the threshold (e.g., the x bits is less than or equal to the threshold quantity of bits), then the UE 904 may perform multiplexing of bits on a repetition based on whether the repetition is overlapping in time with HARQ feedback. For example, the UE 904 may perform a determination procedure 960 to determine whether UCI carrying the HARQ feedback 932 is overlapping in time with a repetition of the uplink message. For example, the UE 904 may determine that a repetition of the uplink message is non-overlapping with the HARQ occasion 934. In such examples, the UE 904 may transmit a second transmission 962 that is received by the network entity 902. The UE 904 may transmit the second transmission 962 while skipping multiplexing on the repetition or by multiplexing zero bits on the repetition. The UE 904 may transmit the second transmission 962 on a PUSCH.

In examples in which a repetition overlaps with HARQ feedback, the UE 904 may multiplex the HARQ feedback and the repetition. For example, the UE 904 may determine, via the determination procedure 960, that a repetition is overlapping in time with the HARQ occasion 934. In such examples, the UE 904 may perform a multiplexing procedure 964 to multiplex x bits of the HARQ feedback 932 with the repetition. As described above in connection with the determination procedure 950, the value of the x bits is less than or equal to the threshold quantity of bits (e.g., 2 bits). Thus, the UE 904 may puncture, via the multiplexing procedure 964, the x bits of the repetition.

As shown in FIG. 9, the UE 904 may transmit a third transmission 966 that is received by the network entity 902. The UE 904 may transmit the third transmission 966 on a PUSCH. The third transmission 966 may include x bits of the HARQ feedback 932 multiplexed on a repetition.

Figure 10:
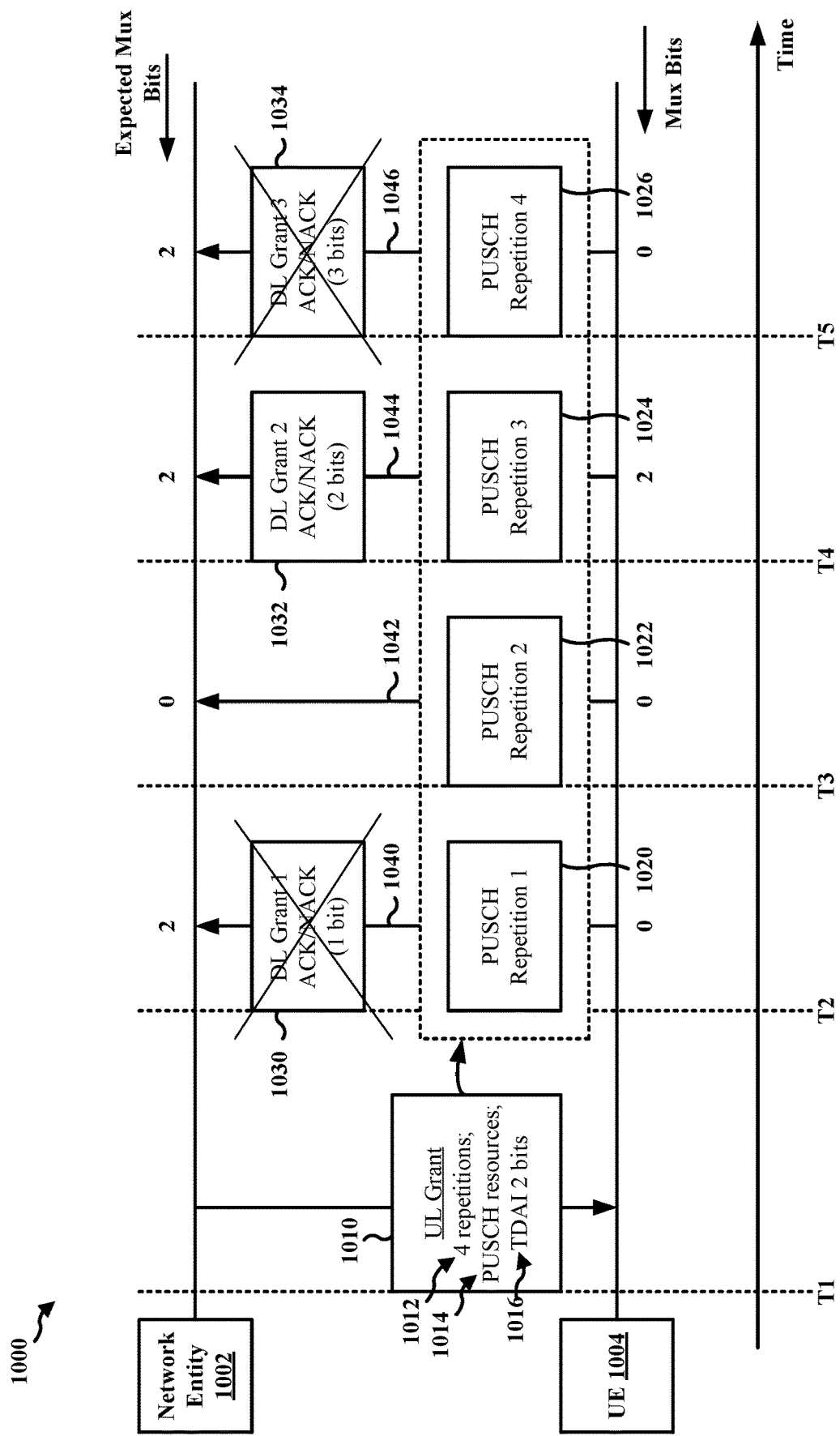
FIG. 10 is a diagram illustrating a timeline of a UE performing HARQ feedback multiplexing on PUSCH with repetitions based on scheduling information from a base station, in accordance with the teachings disclosed herein.

FIG. 10 is a diagram illustrating a timeline 1000 of a UE 1004 performing HARQ feedback multiplexing on PUSCH with repetitions based on scheduling information from a network entity 1002, as presented herein. One or more aspects described for the network entity 1002 may be performed by a component of a base station or a network entity, such as a CU, a DU, and/or an RU. Aspects of the network entity 1002 may be implemented by the base station 102 of FIG. 1, the base station 310 of FIG. 3, and/or the network entity 902 of FIG. 9. Aspects of the UE 1004 may be implemented by the UE 104 of FIG. 1, the UE 350 of FIG. 3, and/or the UE 904 of FIG. 9.

Although not shown in the example of FIG. 10, the network entity 1002 may transmit downlink grants that may be received by the UE 1004 or may be missed by the UE 1004, as described in connection with the examples of FIG. 6B and FIG. 8. The network entity 1002 may transmit the downlink grants on PDCCH. The downlink grants may schedule respective HARQ occasions for transmitting HARQ feedback.

Similar to the example of FIG. 8, the UE 1004 may miss receiving a first downlink grant, may receive a second downlink grant, and may miss receiving a third downlink grant. Based on the three downlink grants transmitted by the network entity 1002, the network entity 1002 may expect to receive first HARQ feedback 1030 ("DL Grant 1 ACK/NACK") with a payload size of one bit at time T2, may expect to receive second HARQ feedback 1032 ("DL Grant 2 ACK/NACK") with a payload size of two bits at time T4, and may expect to receive third HARQ feedback 1034 ("DL Grant 3 ACK/NACK") with a payload size of three bits at time T5. However, based on the downlink grants received by the UE 1004 (e.g., the second downlink grant), the UE 1004 may determine a HARQ occasion for transmitting the second HARQ feedback 1032 at time T4.

In the example of FIG. 10, the network entity 1002 transmits an uplink grant 1010 that is received by the UE 1004 at time T1. The uplink grant 1010 may include a single uplink transmission grant with repetitions. For example, the uplink grant 1010 may schedule k repetitions of an uplink message. In the example of FIG. 10, the uplink grant 1010 includes a repetition indicator 1012 indicating to transmit four repetitions of an uplink message. The uplink grant 1010 also includes PUSCH resources 1014 indicating time resources and/or frequency resources associated with transmitting each of the repetitions of the uplink message. For example, the PUSCH resources 1014 may allocate resources to transmit a first repetition 1020 ("PUSCH Repetition 1") at time T2, resources to transmit a second repetition 1022 ("PUSCH Repetition 2") at time T3, resources to transmit a third repetition 1024 ("PUSCH Repetition 3") at time T4, and resources to transmit a fourth repetition 1026 ("PUSCH Repetition 4") at time T5.

Although the example of FIG. 10 includes the repetition indicator 1012 with the uplink grant 1010, in other examples, the UE 1004 may receive the repetition indicator 1012 via RRC signaling, such as the example RRC signaling 436 of FIG. 4.

The uplink grant 1010 also includes a bit indicator 1016. In the example of FIG. 10 the bit indicator 1016 is a common bit indicator indicating a quantity of x bits to multiplex on repetitions. In the example of FIG. 10, the bit indicator 1016 indicates to multiplex 2 bits on repetitions. Aspects of the bit indicator may be implemented by an UL-TDAI parameter or a common UL-TDAI parameter.

In the example of FIG. 10, the UE 1004 is configured to determine whether to perform multiplexing on a repetition in two steps, as described in connection with the example communication flow 900 of FIG. 9. For example, the UE 1004 may first determine if the quantity of x bits satisfies a threshold quantity of bits, as described in connection with the determination procedure 950 of FIG. 9. For example, the UE 1004 may determine if the 2 bits indicated by the bit indicator 1016 is greater than the threshold quantity of bits. In the example of the FIG. 10, the threshold quantity of bits is two bits, which is the same quantity of bits used by the UE 1004 to determine whether to perform multiplexing on a repetition by puncturing the repetition or by rate-matching.

In the example of FIG. 10, the UE 1004 may determine that the x bits does not satisfy the threshold quantity of bits (e.g., the 2 bits indicated by the bit indicator 1016 is not greater than the threshold quantity of bits (2 bits)). In such scenarios, the UE 1004 may then determine whether to multiplex x bits on a repetition based on whether the repetition overlaps with HARQ feedback, as described in connection with the determination procedure 960 of FIG. 9. For example, with respect to the first repetition 1020 at time T2, the second repetition 1022 at time T3, and the fourth repetition 1026 at time T5, the UE 1004 may determine that there is no overlap with HARQ feedback. Thus, the UE 1004 may determine to transmit a first transmission 1040 at time T2, a second transmission 1042 at time T3, and a fourth transmission 1046 at time T5 based on skipping multiplexing or multiplexing zero bits on the respective repetitions, as described in connection with the second transmission 962 of FIG. 9.

In the example of FIG. 10, the UE 1004 may determine that the third repetition 1024 at time T4 is overlapping in time with the second HARQ feedback 1032. In such scenarios, the UE 1004 may multiplex x bits on the third repetition 1024. For example, the UE 1004 may transmit a third transmission 1044 at time T4 including two bits multiplexed on the third repetition 1024, as described in connection with the third transmission 966 of FIG. 9. As described above, when the value of the x bits is less than or equal to two bits, the UE 1004 multiplexes the x bits by puncturing the repetition. For example, the UE 1004 may puncture two bits of the third repetition 1024.

Thus, as shown in FIG. 10, the UE 1004 may multiplex {0, 0, 2, 0} bits for the repetitions of the uplink message at times T2, T3, T4, and T5, respectively. Additionally, the network entity 1002 may expect the repetitions of the uplink message to be multiplexed with expected multiplexing of {2, 0, 2, 2} bits. Although the quantity of multiplexed bits (e.g., at the UE 1004) and the quantity of expected multiplexed bits (e.g., at the network entity 1002) are misaligned, the impact of the mis-synchronization between the UE 1004 and the network entity 1002 is small as the network entity 1002 was expecting the first transmission 1040 at time T2 and the fourth transmission 1046 at time T5 to include the first repetition 1020 and the fourth repetition 1026, respectively, that each include two punctured bits. However, as described above, a transmission including zero bits, one bit, or two bits punctured has little negative impact on the ability of the network entity 1002 to decode the transmission. Thus, the misalignment of the quantity of multiplexed bits (e.g., at the UE 1004) and the quantity of expected multiplexed bits (e.g., at the network entity 1002) may be acceptable and still provide improvements when performing HARQ feedback multiplexing on PUSCH with repetitions.

Figure 11:
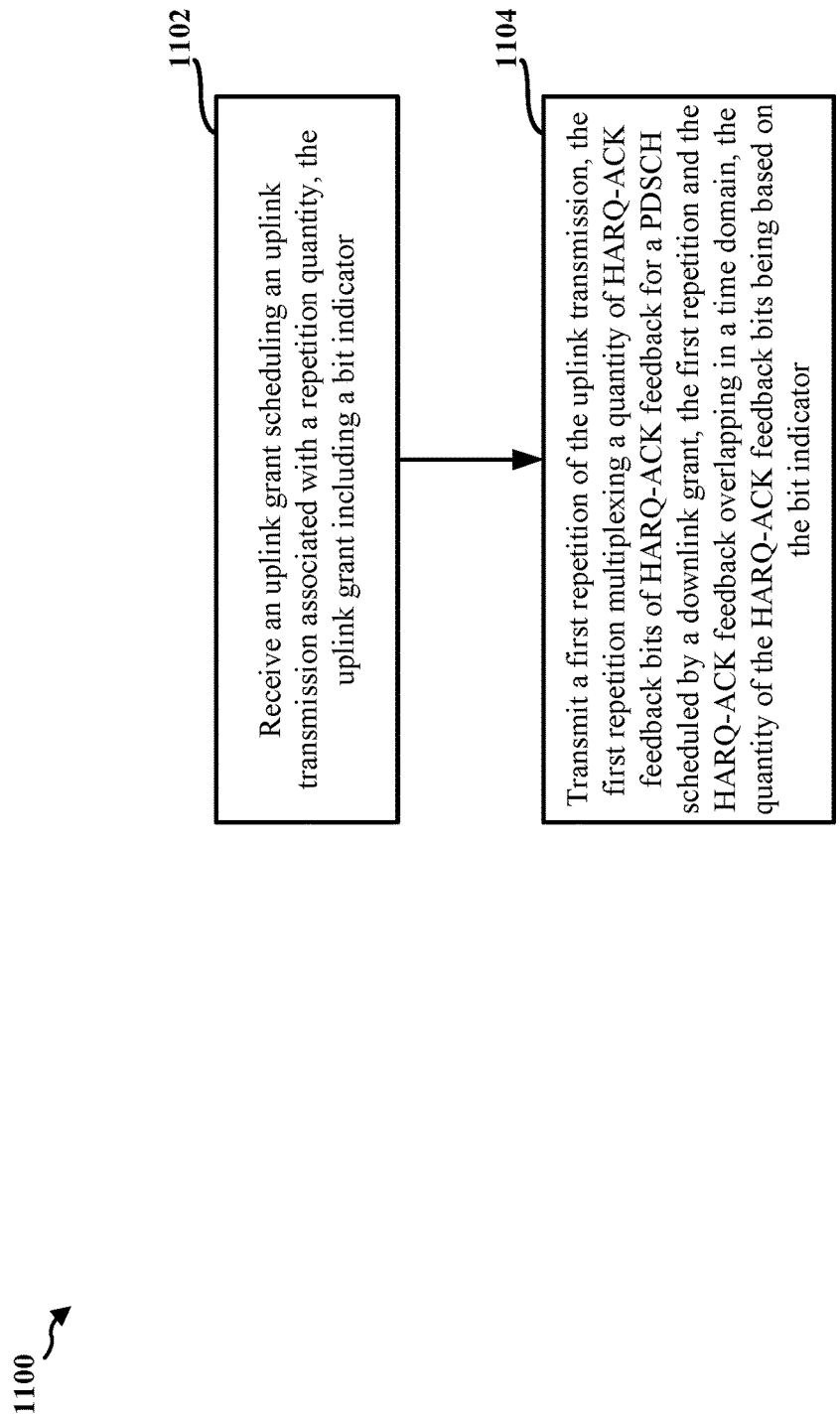
FIG. 11 is a flowchart of a method of wireless communication at a UE, in accordance with the teachings disclosed herein.

FIG. 11 is a flowchart 1100 of a method of wireless communication. The method may be performed by a UE (e.g., the UE 104, and/or an apparatus 1304 of FIG. 13). The method may facilitate higher data rates, improved capacity and/or improved spectral efficiency by enabling a UE to perform HARQ feedback multiplexing on PUSCH with repetitions based on a bit indicator included in an uplink grant.

At 1102, the UE receives an uplink grant scheduling an uplink transmission associated with a repetition quantity, the uplink grant including a bit indicator, as described in connection with the uplink grant 710 of FIG. 7, the uplink grant 810 of FIG. 8, the uplink grant 940 of FIG. 9, and/or the uplink grant 1010 of FIG. 10. The receiving of the uplink grant, at 1102, may be performed by a cellular RF transceiver 1322/the repetition component 198 of the apparatus 1304 of FIG. 13.

At 1104, the UE transmits a first repetition of the uplink transmission, the first repetition multiplexing a quantity of HARQ-ACK feedback bits of HARQ-ACK feedback for a PDSCH scheduled by a downlink grant, the first repetition and the HARQ-ACK feedback overlapping in a time domain, the quantity of the HARQ-ACK feedback bits being based on the bit indicator, as described in connection with the uplink transmissions of FIG. 7, the uplink transmissions of FIG. 8, the uplink transmissions of FIG. 9, and/or the uplink transmissions of FIG. 10. The transmitting of the first repetition of the uplink transmission, at 1104, may be performed by the cellular RF transceiver 1322/the repetition component 198 of the apparatus 1304 of FIG. 13.

Figure 12:
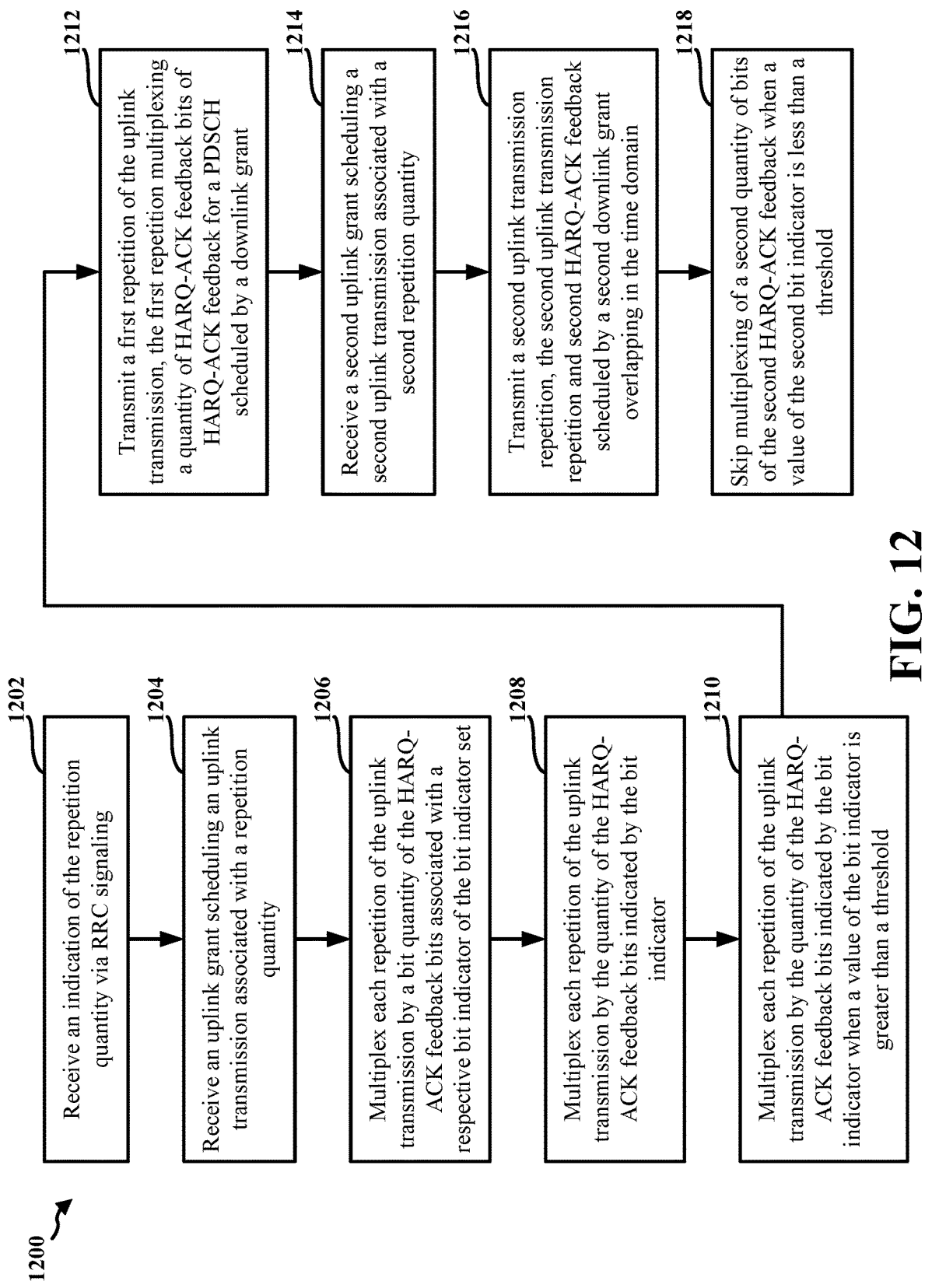
FIG. 12 is a flowchart of a method of wireless communication at a UE, in accordance with the teachings disclosed herein.

FIG. 12 is a flowchart 1200 of a method of wireless communication. The method may be performed by a UE (e.g., the UE 104, and/or an apparatus 1304 of FIG. 13). The method may facilitate higher data rates, improved capacity and/or improved spectral efficiency by enabling a UE to perform HARQ feedback multiplexing on PUSCH with repetitions based on a bit indicator included in an uplink grant.

At 1204, the UE receives an uplink grant scheduling an uplink transmission associated with a repetition quantity, the uplink grant including a bit indicator, as described in connection with the uplink grant 710 of FIG. 7, the uplink grant 810 of FIG. 8, the uplink grant 940 of FIG. 9, and/or the uplink grant 1010 of FIG. 10. The receiving of the uplink grant, at 1204, may be performed by a cellular RF transceiver 1322/the repetition component 198 of the apparatus 1304 of FIG. 13.

At 1212, the UE transmits a first repetition of the uplink transmission, the first repetition multiplexing a quantity of HARQ-ACK feedback bits of HARQ-ACK feedback for a PDSCH scheduled by a downlink grant, the first repetition and the HARQ-ACK feedback overlapping in a time domain, the quantity of the HARQ-ACK feedback bits being based on the bit indicator, as described in connection with the uplink transmissions of FIG. 7, the uplink transmissions of FIG. 8, the uplink transmissions of FIG. 9, and/or the uplink transmissions of FIG. 10. The transmitting of the first repetition of the uplink transmission, at 1212, may be performed by the cellular RF transceiver 1322/the repetition component 198 of the apparatus 1304 of FIG. 12.

In some examples, the downlink grant, at 1212, may include a downlink bit indicator and the quantity of the HARQ-ACK feedback bits may be a same quantity as the bit indicator when the bit indicator is greater than or equal to the downlink bit indicator, as described in connection with Equation 3 (above). In some examples, the quantity of the HARQ-ACK feedback bits may be based on a relationship between the bit indicator and the downlink bit indicator when the downlink bit indicator is greater than the bit indicator, as described in connection with Equation 1 (above) and Equation 2 (above).

In some examples, the uplink grant, at 1204, may include an indication of the repetition quantity, as described in connection with the uplink grant 710 of FIG. 7, the uplink grant 810 of FIG. 8, the uplink grant 940 of FIG. 9, and/or the uplink grant 1010 of FIG. 10. In some examples, the UE may receive, at 1202, an indication of the repetition quantity associated with the uplink message via RRC signaling, as described in connection with the RRC signaling 436 of FIG. 4. The receiving of the indication, at 1202, may be performed by the repetition component 198 of the apparatus 1304 of FIG. 13.

In some examples, the bit indicator, at 1204, may be a first bit indicator of a bit indicator set including a number of bit indicators, as described in connection with the bit indicator set 716 of FIG. 7. In some examples, the repetition quantity and the number of bit indicators may be a same quantity, as described in connection with the repetition indicator 712 and the bit indicator set 716 of FIG. 7.

In examples in which the bit indicator is included in a bit indicator set, the UE may, at 1206, multiplex each repetition of the uplink transmission by a bit quantity of the HARQ-ACK feedback bits associated with a respective bit indicator of the bit indicator set, as described in connection with the multiplexed bits of the transmissions of FIG. 7. In some examples, the multiplexing of each repetition may be based on a rate-matching. The multiplexing of each repetition of the uplink transmission, at 1206, may be performed by the repetition component 198 of the apparatus 1304 of FIG. 13.

In some examples, the UE may multiplex, at 1208, each repetition of the uplink transmission by the quantity of the HARQ-ACK feedback bits indicated by the bit indicator, as described in connection with the example repetitions and the bit indicator 816 of FIG. 8, and/or the first transmission 954 of FIG. 9. In some examples, a second repetition of the uplink transmission may be non-overlapping in the time domain with second HARQ-ACK feedback scheduled by a second downlink grant, as described in connection with the second transmission 842 and the three multiplexed bits on the second repetition 822 of FIG. 8. In some examples, the multiplexing of each repetition may be based on a rate-matching. The multiplexing of each repetition, at 1208, may be performed by the repetition component 198 of the apparatus 1304 of FIG. 13.

In some examples, the UE may, at 1210, to multiplex each repetition of the uplink transmission by the quantity of the HARQ-ACK feedback bits indicated by the bit indicator when a value of the bit indicator is greater than a threshold, as described in connection with the determination procedure 950, the multiplexing procedure 952, and the first transmission 954 of FIG. 9. In some examples, the threshold may be two bits. In some examples, a second repetition of the uplink transmission may be non-overlapping in the time domain with a second HARQ-ACK feedback scheduled by a second downlink grant, as described in connection with the second transmission 842 and the three multiplexed bits on the second repetition 822 of FIG. 8. In some examples, the multiplexing of each repetition may be based on a rate-matching. The multiplexing of each repetition, at 1210, may be performed by the repetition component 198 of the apparatus 1304 of FIG. 13.

In some examples, the UE may, at 1214, receive a second uplink grant scheduling a second uplink transmission associated with a second repetition quantity, the second uplink grant including a second bit indicator. The UE may also, at 1216, transmit a second uplink transmission repetition, the second uplink transmission repetition and second HARQ-ACK feedback scheduled by a second downlink grant overlapping in the time domain. In some such examples, the UE may, at 1218, skip multiplexing of a second quantity of HARQ-ACK feedback bits of the second HARQ-ACK feedback when a value of the second bit indicator is less than a threshold. In some examples, the threshold may be two bits. The receiving of the second uplink grant, at 1214, the transmitting of the second uplink transmission repetition, at 1216, and the skipping of the multiplexing, at 1218, may be performed by the repetition component 198 of the apparatus 1304 of FIG. 13.

In some examples, the UE may be configured to multiplex a second repetition of the uplink transmission by the quantity of the HARQ-ACK feedback bits indicated by the bit indicator when the second repetition is overlapping in the time domain with a second HARQ-ACK feedback scheduled by a second downlink grant and the value of the bit indicator is less than or equal to the threshold, as described in connection with the determination procedure 960, the multiplexing procedure 964, and the third transmission 966 of FIG. 9. In some examples, the UE may multiplex the second repetition based on puncturing the second repetition based on the quantity of the HARQ-ACK feedback bits indicated by the bit indicator.

Figure 13:
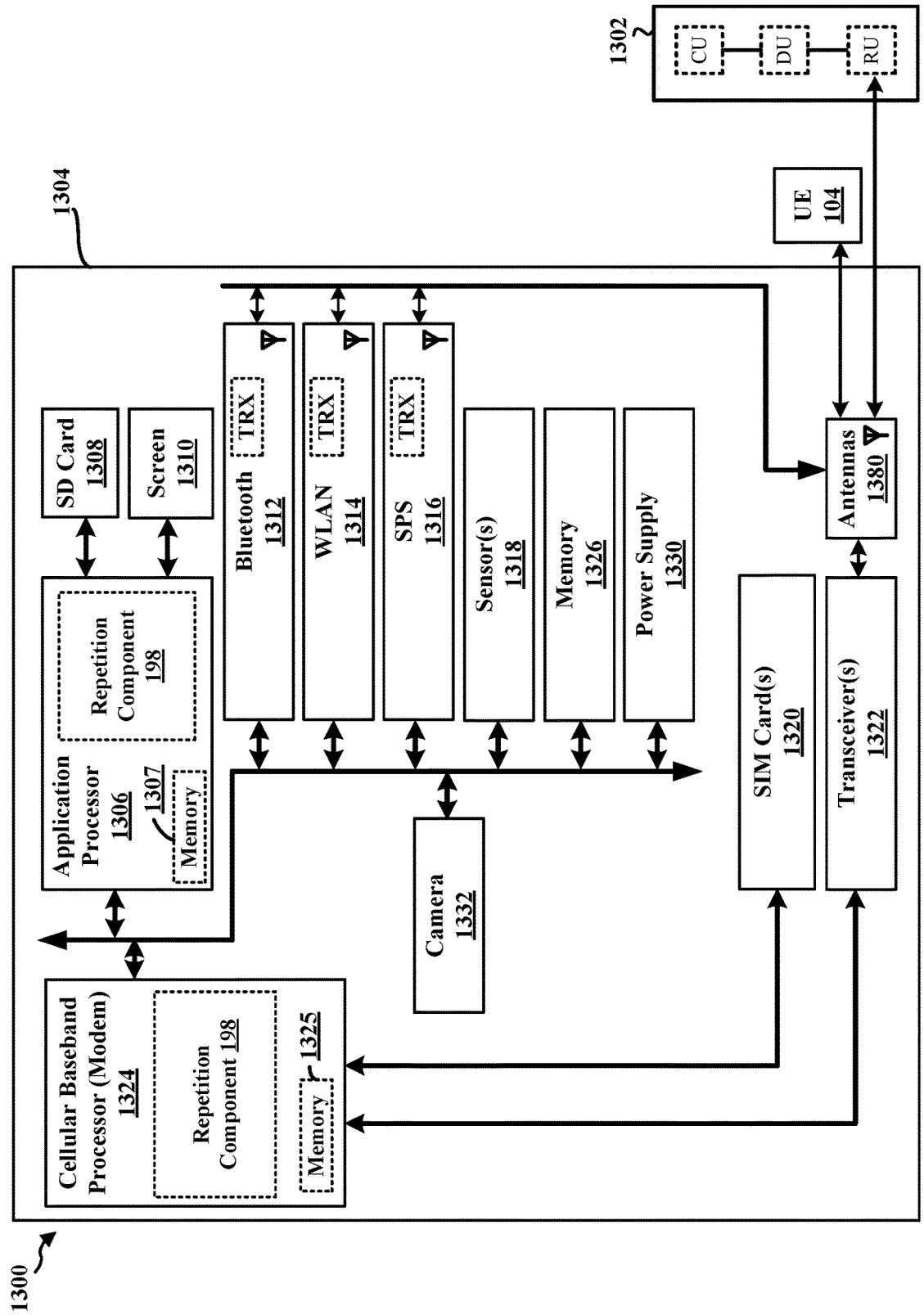
FIG. 13 is a diagram illustrating an example of a hardware implementation for an example network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers (e.g., a cellular RF transceiver 1322). The cellular baseband processor 1324 may include on-chip memory 1325. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1307. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize one or more antennas 1380 for communication. The cellular baseband processor 1324 communicates through transceiver(s) (e.g., the cellular RF transceiver 1322) via one or more antennas 1380 with the UE 104 and/or with an RU associated with a network entity 1302. The cellular baseband processor 1324 and the application processor 1306 may each include a computer-readable medium/memory, such as the on-chip memory 1325, and the on-chip memory 1307, respectively. The additional memory modules 1326 may also be considered a computer-readable medium/memory. Each computer-readable medium/memory (e.g., the on-chip memory 1325, the on-chip memory 1307, and/or the additional memory modules 1326) may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see the UE 350 of FIG. 3) and include the additional modules of the apparatus 1304.

As discussed supra, the repetition component 198 is configured to receive an uplink grant scheduling an uplink transmission associated with a repetition quantity, the uplink grant including a bit indicator. The repetition component 198 may also be configured to transmit a first repetition of the uplink transmission, the first repetition multiplexing a quantity of HARQ-ACK feedback bits of HARQ-ACK feedback for a PDSCH scheduled by a downlink grant, the first repetition and the HARQ-ACK feedback overlapping in a time domain, the quantity of the HARQ-ACK feedback bits being based on the bit indicator.

The repetition component 198 may be within the cellular baseband processor 1324, the application processor 1306, or both the cellular baseband processor 1324 and the application processor 1306. The repetition component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1304 may include a variety of components configured for various functions. For example, the repetition component 198 may include one or more hardware components that perform each of the blocks of the algorithm in the flowcharts of FIG. 11 and/or FIG. 12.

In one configuration, the apparatus 1304, and in particular the cellular baseband processor 1324 and/or the application processor 1306, includes means for receiving an uplink grant scheduling an uplink transmission associated with a repetition quantity, the uplink grant including a bit indicator. The example apparatus 1304 also includes means for transmitting a first repetition of the uplink transmission, the first repetition multiplexing a quantity of HARQ-ACK feedback bits of HARQ-ACK feedback for a PDSCH scheduled by a downlink grant, the first repetition and the HARQ-ACK feedback overlapping in a time domain, the quantity of the HARQ-ACK feedback bits being based on the bit indicator.

In another configuration, the example apparatus 1304 also includes means for multiplexing each repetition of the uplink transmission by a bit quantity of the HARQ-ACK feedback bits associated with a respective bit indicator of the bit indicator set.

In another configuration, the example apparatus 1304 also includes means for multiplexing each repetition of the uplink transmission by the quantity of the HARQ-ACK feedback bits indicated by the bit indicator.

In another configuration, the example apparatus 1304 also includes means for multiplexing each repetition of the uplink transmission by the quantity of the HARQ-ACK feedback bits indicated by the bit indicator when a value of the bit indicator is greater than a threshold.

In another configuration, the example apparatus 1304 also includes means for receiving a second uplink grant scheduling a second uplink transmission associated with a second repetition quantity, the second uplink grant including a second bit indicator. The example apparatus 1304 also includes means for transmitting a second uplink transmission repetition, the second uplink transmission repetition and second HARQ-ACK feedback scheduled by a second downlink grant overlapping in the time domain. The example apparatus 1304 also includes means for skipping multiplexing of a second quantity of bits of the second HARQ-ACK feedback when a value of the second bit indicator is less than a threshold.

In another configuration, the example apparatus 1304 also includes means for receiving an indication of the repetition quantity via RRC signaling.

The means may be the repetition component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
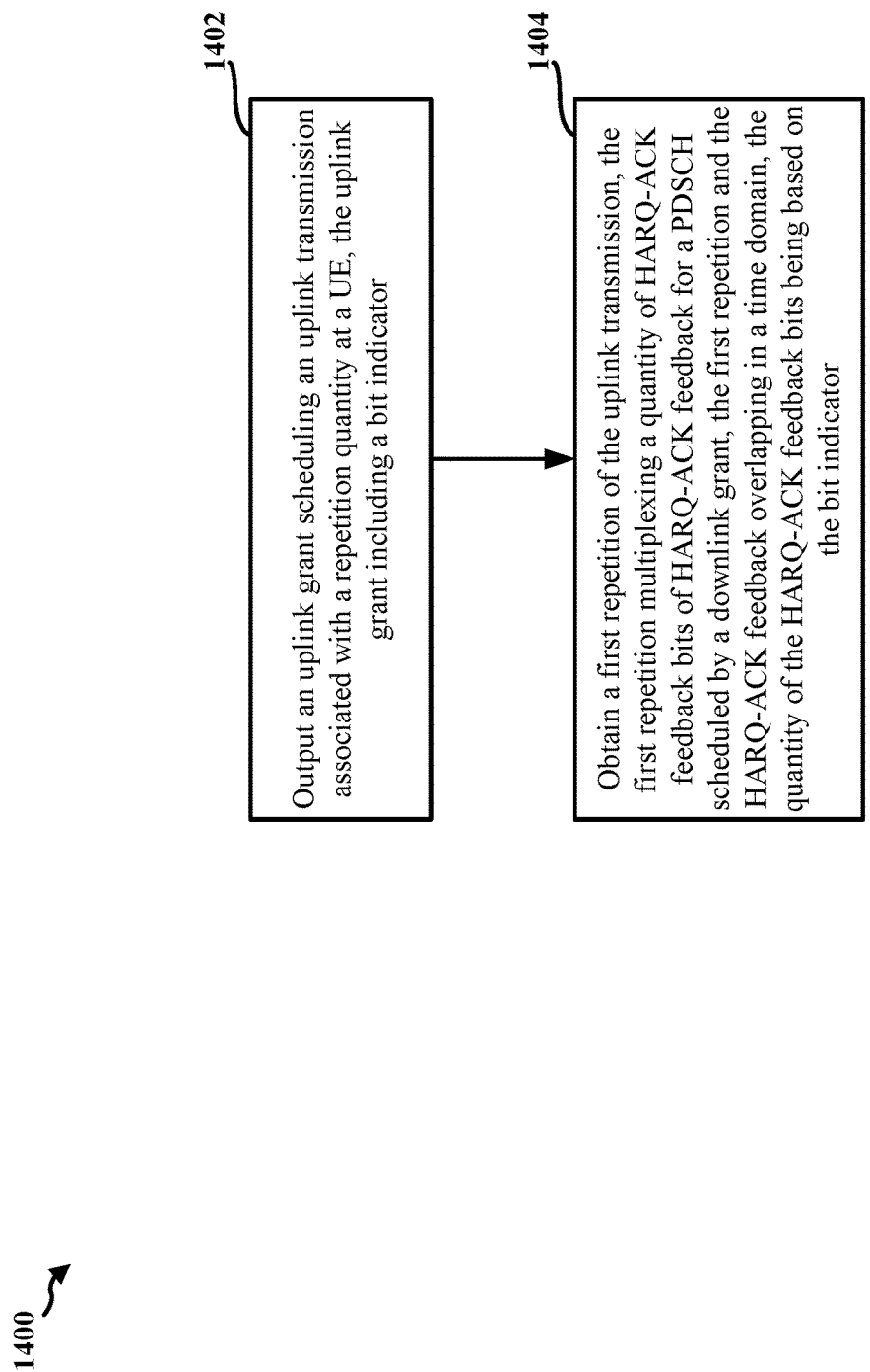
FIG. 14 is a flowchart of a method of wireless communication at a network entity, in accordance with the teachings disclosed herein.

FIG. 14 is a flowchart 1400 of a method of wireless communication. The method may be performed by a network node or by one or more components of a network node (e.g., the base station 102, the base station 310; the CU 110; the DU 130; the RU 140; and/or a network entity 1602 of FIG. 16). The method may facilitate higher data rates, improved capacity and/or improved spectral efficiency by enabling a UE to perform HARQ feedback multiplexing on PUSCH with repetitions based on a bit indicator included in an uplink grant.

At 1402, the network node outputs an uplink grant scheduling an uplink transmission associated with a repetition quantity at a UE, the uplink grant including a bit indicator, as described in connection with the uplink grant 710 of FIG. 7, the uplink grant 810 of FIG. 8, the uplink grant 940 of FIG. 9, and/or the uplink grant 1010 of FIG. 10. In some aspects, the network node may transmit the uplink grant scheduling the uplink transmission associated with a repetition quantity at the UE. The outputting of the uplink grant, at 1402, may be performed by the scheduling component 199 of the network entity 1602 of FIG. 16.

At 1404, the network node obtains a first repetition of the uplink transmission, the first repetition multiplexing a quantity of HARQ-ACK feedback bits of HARQ-ACK feedback for a PDSCH scheduled by a downlink grant, the first repetition and the HARQ-ACK feedback overlapping in a time domain, the quantity of the HARQ-ACK feedback bits being based on the bit indicator, as described in connection with the uplink transmissions of FIG. 7, the uplink transmissions of FIG. 8, the uplink transmissions of FIG. 9, and/or the uplink transmissions of FIG. 10. In some aspects, the network node may receive the first repetition of the uplink transmission. The obtaining of the first repetition, at 1404, may be performed by the scheduling component 199 of the network entity 1602 of FIG. 16.

Figure 15:
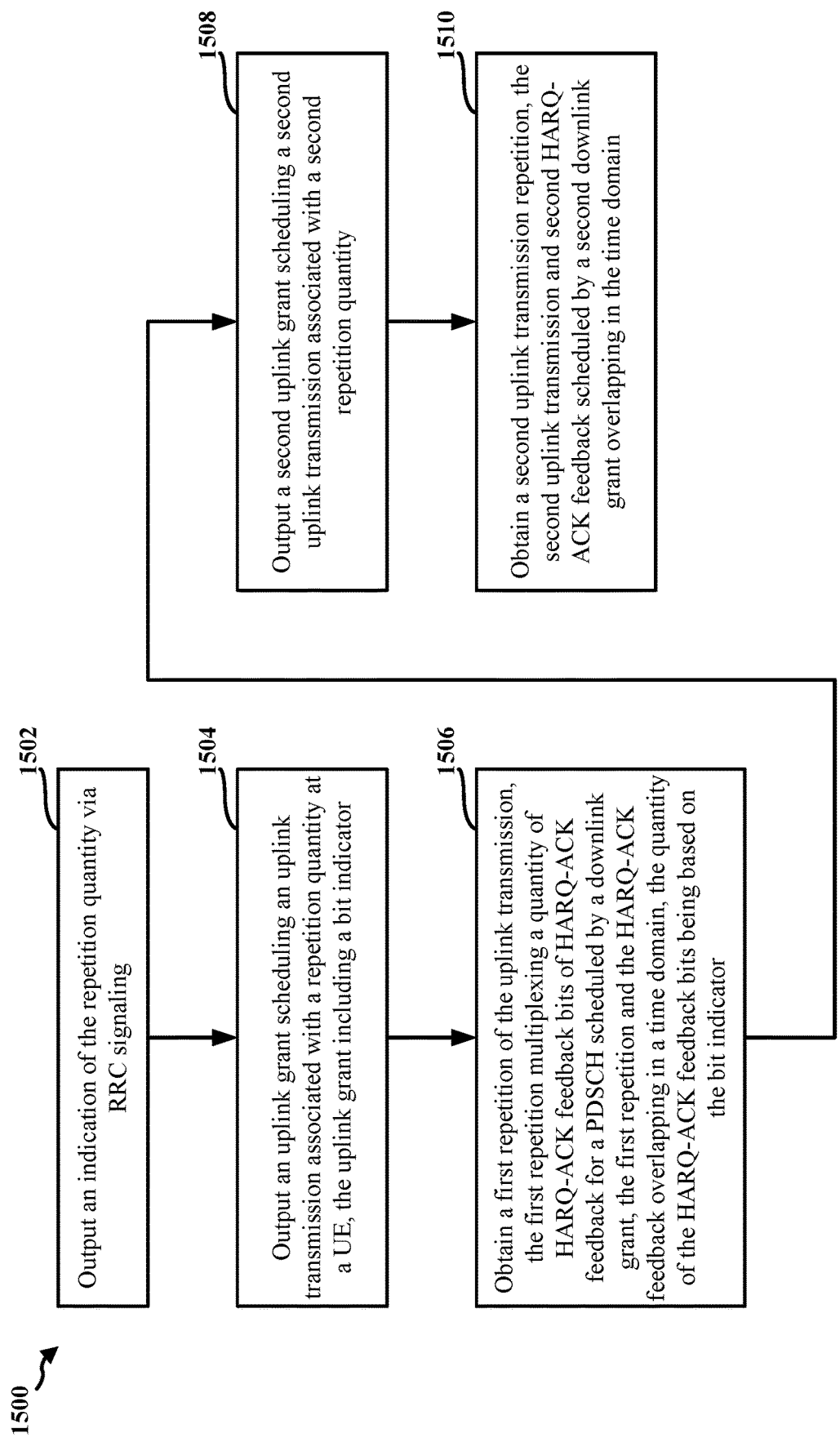
FIG. 15 is a flowchart of a method of wireless communication at a network entity, in accordance with the teachings disclosed herein.

FIG. 15 is a flowchart 1500 of a method of wireless communication. The method may be performed by a network node or by one or more components of a network node (e.g., the base station 102, the base station 310; the CU 110; the DU 130; the RU 140; and/or a network entity 1602 of FIG. 16). The method may facilitate higher data rates, improved capacity and/or improved spectral efficiency by enabling a UE to perform HARQ feedback multiplexing on PUSCH with repetitions based on a bit indicator included in an uplink grant.

At 1504, the network node outputs an uplink grant scheduling an uplink transmission associated with a repetition quantity at a UE, the uplink grant including a bit indicator, as described in connection with the uplink grant 710 of FIG. 7, the uplink grant 810 of FIG. 8, the uplink grant 940 of FIG. 9, and/or the uplink grant 1010 of FIG. 10. In some aspects, the network node may transmit the uplink grant scheduling the uplink transmission associated with a repetition quantity at the UE. The outputting of the uplink grant, at 1504, may be performed by the scheduling component 199 of the network entity 1602 of FIG. 16.

At 1506, the network node obtains a first repetition of the uplink transmission, the first repetition multiplexing a quantity of HARQ-ACK feedback bits of HARQ-ACK feedback for a PDSCH scheduled by a downlink grant, the first repetition and the HARQ-ACK feedback overlapping in a time domain, the quantity of the HARQ-ACK feedback bits being based on the bit indicator, as described in connection with the uplink transmissions of FIG. 7, the uplink transmissions of FIG. 8, the uplink transmissions of FIG. 9, and/or the uplink transmissions of FIG. 10. In some aspects, the network node may receive the first repetition of the uplink transmission. The obtaining of the first repetition, at 1506, may be performed by the scheduling component 199 of the network entity 1602 of FIG. 16.

In some examples, the downlink grant, at 1506, may include a downlink bit indicator and the quantity of the HARQ-ACK feedback bits may be a same quantity as the bit indicator when the bit indicator is greater than or equal to the downlink bit indicator, as described in connection with Equation 3 (above). In some examples, the quantity of the HARQ-ACK feedback bits may be based on a relationship between the bit indicator and the downlink bit indicator when the downlink bit indicator is greater than the bit indicator, as described in connection with Equation 1 (above) and Equation 2 (above).

In some examples, the uplink grant, at 1504, may include an indication of the repetition quantity, as described in connection with the uplink grant 710 of FIG. 7, the uplink grant 810 of FIG. 8, the uplink grant 940 of FIG. 9, and/or the uplink grant 1010 of FIG. 10. In some examples, the network node may output, at 1502, an indication of the repetition quantity associated with the uplink message via RRC signaling, as described in connection with the RRC signaling 436 of FIG. 4. The outputting of the indication, at

Figure 16:
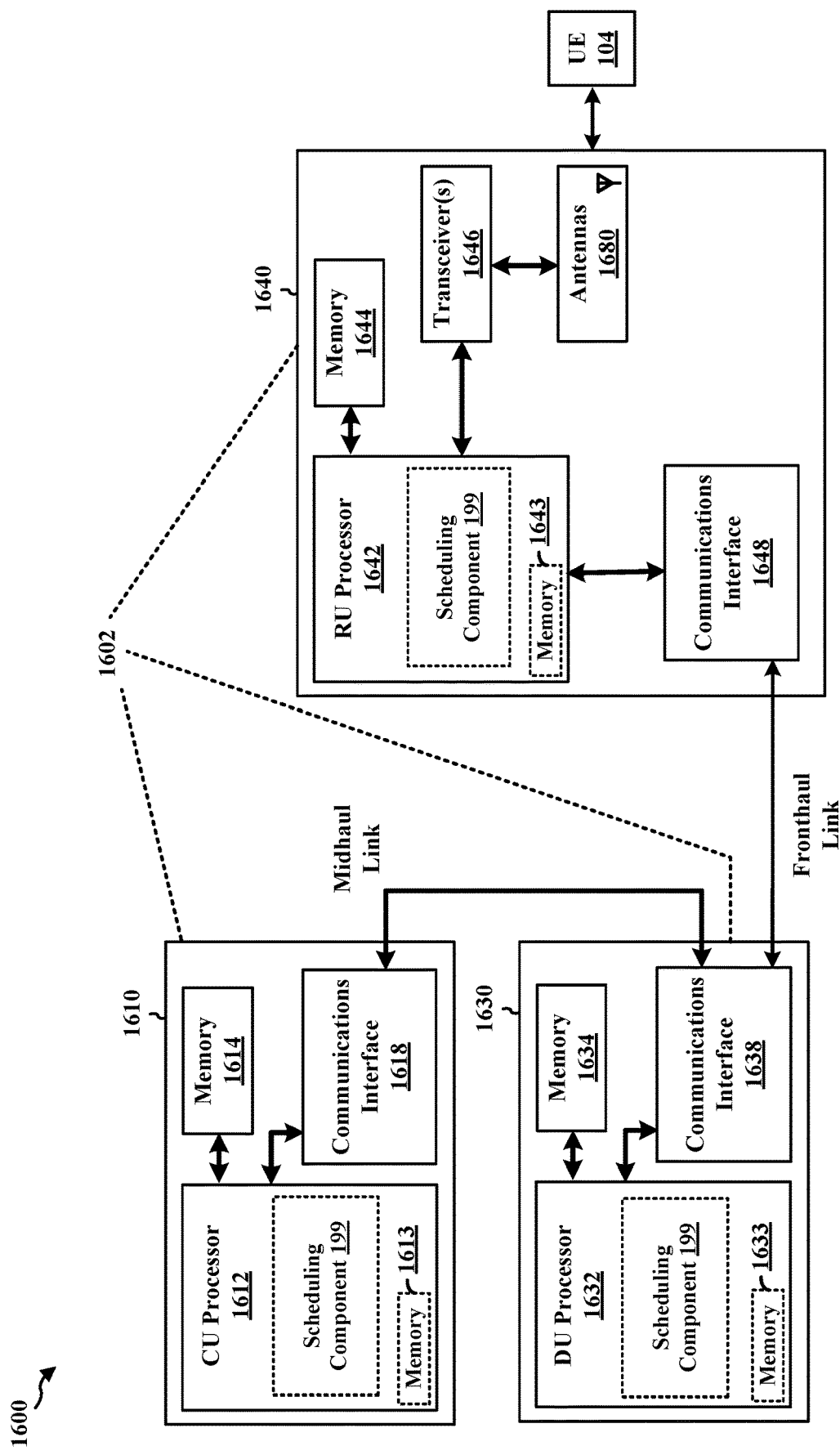
FIG. 16 is a diagram illustrating an example of a hardware implementation for an example network entity.

1502, may be performed by the scheduling component 199 of the network entity 1602 of FIG. 16.

In some examples, the bit indicator, at 1504, may be a first bit indicator of a bit indicator set including a number of bit indicators, as described in connection with the bit indicator set 716 of FIG. 7. In some examples, the repetition quantity and the number of bit indicators may be a same quantity, as described in connection with the repetition indicator 712 and the bit indicator set 716 of FIG. 7.

In examples in which the bit indicator of 1504 is included in a bit indicator set, each repetition of the uplink transmission may be multiplexed by a bit quantity of the HARQ-ACK feedback bits associated with a respective bit indicator of the bit indicator set, as described in connection with the multiplexed bits of the transmissions of FIG. 7. In some examples, the multiplexing of each repetition may be based on a rate-matching.

In some examples, each repetition of the uplink transmission, at 1506, may be multiplexed by the quantity of the HARQ-ACK feedback bits indicated by the bit indicator, as described in connection with the example repetitions and the bit indicator 816 of FIG. 8, and/or the first transmission 954 of FIG. 9. In some examples, a second repetition of the uplink transmission may be non-overlapping in the time domain with second HARQ-ACK feedback scheduled by a second downlink grant, as described in connection with the second transmission 842 and the three multiplexed bits on the second repetition 822 of FIG. 8. In some examples, the multiplexing of each repetition may be based on a rate-matching.

In some examples, each repetition of the uplink transmission, at 1506, may be multiplexed by the quantity of the HARQ-ACK feedback bits indicated by the bit indicator when a value of the bit indicator is greater than a threshold, as described in connection with the determination procedure 950, the multiplexing procedure 952, and the first transmission 954 of FIG. 9. In some examples, the threshold may be two bits. In some examples, a second repetition of the uplink transmission may be multiplexed by the quantity of the HARQ-ACK feedback bits indicated by the bit indicator when the second repetition of the uplink transmission is non-overlapping in the time domain with a second HARQ-ACK feedback scheduled by a second downlink grant, as described in connection with the second transmission 842 and the three multiplexed bits on the second repetition 822 of FIG. 8. In some examples, the multiplexing of each repetition may be based on a rate-matching.

In some examples, the network node may, at 1508, output a second uplink grant scheduling a second uplink transmission associated with a second repetition quantity, the second uplink grant including a second bit indicator. As an example, the network node may transmit the second uplink grant scheduling the second uplink transmission associated with the second repetition quantity. The network node may, at 1510, obtain a second uplink transmission repetition, the second uplink transmission repetition and second HARQ-ACK feedback scheduled by a second downlink grant overlapping in the time domain. In some such examples, the second uplink transmission repetition may exclude multiplexing of a second quantity of HARQ-ACK feedback bits of the second HARQ-ACK feedback when a value of the second bit indicator is less than a threshold. In some examples, the threshold may be two bits. The outputting of the second uplink grant, at 1508, and the obtaining of the second uplink transmission repetition, at 1510, may be performed by the scheduling component 199 of the network entity 1602 of FIG. 16.

In some examples, a second repetition of the uplink transmission may be multiplexed by the quantity of the HARQ-ACK feedback bits indicated by the bit indicator when the second repetition is overlapping in the time domain with a second HARQ-ACK feedback scheduled by a second downlink grant and the value of the bit indicator is less than or equal to the threshold, as described in connection with the determination procedure 960, the multiplexing procedure 964, and the third transmission 966 of FIG. 9. In some examples, the second repetition may be multiplexed based on puncturing the second repetition based on the quantity of the HARQ-ACK feedback bits indicated by the bit indicator.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the scheduling component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1613. In some aspects, may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1633. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1643. In some aspects, the RU 1640 may further include additional memory modules 1644, one or more transceivers 1646, antennas 1680, and a communications interface 1648. The RU 1640 communicates with the UE 104. The on-chip memories (e.g., the on-chip memory 1613, the on-chip memory 1633, and/or the on-chip memory 1643) and/or the additional memory modules (e.g., the additional memory modules 1614, the additional memory modules 1634, and/or the additional memory modules 1644) may each be considered a computer-readable medium/memory. Each computer-readable medium/memory may be non-transitory. Each of the CU processor 1612, the DU processor 1632, the RU processor 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the scheduling component 199 is configured to output an uplink grant scheduling an uplink transmission associated with a repetition quantity at a UE, the uplink grant including a bit indicator. The scheduling component 199 may also be configured to obtain a first repetition of the uplink transmission, the first repetition multiplexing a quantity of HARQ-ACK feedback bits of HARQ-ACK feedback for a PDSCH scheduled by a downlink grant, the first repetition and the HARQ-ACK feedback overlapping in a time domain, the quantity of the HARQ-ACK feedback bits being based on the bit indicator.

The scheduling component 199 may be within one or more processors of one or more of the CU 1610, DU 1630, and the RU 1640. The scheduling component 199 may be one or more hardware components specifically configured to carry out the stated processes/algorithm, implemented by one or more processors configured to perform the stated processes/algorithm, stored within a computer-readable medium for implementation by one or more processors, or some combination thereof.

The network entity 1602 may include a variety of components configured for various functions. For example, the scheduling component 199 may include one or more hardware components that perform each of the blocks of the algorithm in the flowcharts of FIG. 14 and/or FIG. 15.

In one configuration, the network entity 1602 includes means for outputting an uplink grant scheduling an uplink transmission associated with a repetition quantity at a UE, the uplink grant including a bit indicator. The example network entity 1602 also includes means for obtaining a first repetition of the uplink transmission, the first repetition multiplexing a quantity of HARQ-ACK feedback bits of HARQ-ACK feedback for a PDSCH scheduled by a downlink grant, the first repetition and the HARQ-ACK feedback overlapping in a time domain, the quantity of the HARQ-ACK feedback bits being based on the bit indicator.

In another configuration, the example network entity 1602 also includes means for outputting a second uplink grant scheduling a second uplink transmission associated with a second repetition quantity, the second uplink grant including a second bit indicator. The example network entity 1602 also includes means for obtaining a second uplink transmission repetition, the second uplink transmission and second HARQ-ACK feedback scheduled by a second downlink grant overlapping in the time domain, where the second uplink transmission repetition excludes multiplexing of a second quantity of bits of the second HARQ-ACK feedback when a value of the second bit indicator is less than a threshold.

In another configuration, the example network entity 1602 also includes means for outputting an indication of the repetition quantity via RRC signaling.

The means may be the scheduling component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

Aspects disclosed herein provide techniques for improving HARQ feedback multiplexing on PUSCH with repetitions. The disclosed techniques may provide higher data rates, improve capacity, and/or improve spectral efficiency. For example, aspects disclosed herein may configure a UE to determine to perform multiplexing on a repetition regardless of whether the repetition overlaps in time with HARQ feedback. Additionally, the UE may perform the multiplexing based on a quantity of bits indicated by an uplink grant. By determining to perform the multiplexing based on the quantity of bits indicated by an uplink grant (e.g., a bit indicator) and regardless of whether there is an overlap in time, the UE may resolve concerns associated with missed downlink grants. In some examples, the bit indicator may include a bit indicator set including a number of bit indicators. For example, the quantity of bit indicators in the bit indicator set may correspond to a quantity of repetitions configured for an uplink message. The quantity of repetitions may be indicated via the uplink grant and/or via radio resource control (RRC) signaling. In some such examples, the UE may use a respective bit indicator of the bit indicator set to determine a quantity of z bits to multiplex on a respective repetition. In other examples, the bit indicator set may include one bit indicator that is applied to each repetition of the uplink message.

In another aspect, the UE may be configured to determine whether to perform multiplexing on a repetition based on a bit indicator included in an uplink grant. For example, when the value of the bit indicator satisfies a threshold (e.g., x bits of the bit indicator is greater than or equal to the threshold), the UE may perform multiplexing on a repetition regardless of whether the repetition overlaps in time with HARQ feedback scheduled by a downlink grant. In examples in which the value of the bit indicator does not satisfy the threshold (e.g., the x bits is less than the threshold), then the UE may multiplex the x bits of the HARQ feedback on a repetition when the repetition overlaps in time with the HARQ feedback. The UE may also skip multiplexing or multiplex zero bits on a repetition when the repetition is non-overlapping in time with the HARQ feedback.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising: receiving an uplink grant scheduling an uplink transmission associated with a repetition quantity, the uplink grant including a bit indicator; and transmitting a first repetition of the uplink transmission, the first repetition multiplexing a quantity of Hybrid Automatic Repeat Request (HARD) acknowledgement (HARQ-ACK) feedback bits of HARQ-ACK feedback for a physical downlink shared channel (PDSCH) scheduled by a downlink grant, the first repetition and the HARQ-ACK feedback overlapping in a time domain, the quantity of the HARQ-ACK feedback bits being based on the bit indicator.

Aspect 2 is the method of aspect 1, further including that the bit indicator is a first bit indicator of a bit indicator set including a number of bit indicators, the repetition quantity and the number of bit indicators being a same quantity.

Aspect 3 is the method of any of aspects 1 and 2, further including: multiplexing each repetition of the uplink transmission by a bit quantity of the HARQ-ACK feedback bits associated with a respective bit indicator of the bit indicator set.

Aspect 4 is the method of any of aspects 1 to 3, further including that multiplexing of each repetition is based on a rate-matching.

Aspect 5 is the method of any of aspects 1 to 4, further including: multiplexing each repetition of the uplink transmission by the quantity of the HARQ-ACK feedback bits indicated by the bit indicator.

Aspect 6 is the method of any of aspects 1 to 5, further including that a second repetition of the uplink transmission is non-overlapping in the time domain with second HARQ-ACK feedback scheduled by a second downlink grant.

Aspect 7 is the method of any of aspects 1 to 6, further including that multiplexing of each repetition is based on a rate-matching.

Aspect 8 is the method of any of aspects 1 to 7, further including: multiplexing each repetition of the uplink transmission by the quantity of the HARQ-ACK feedback bits indicated by the bit indicator when a value of the bit indicator is greater than a threshold.

Aspect 9 is the method of any of aspects 1 to 8, further including that the threshold is two bits.

Aspect 10 is the method of any of aspects 1 to 9, further including that a second repetition of the uplink transmission is non-overlapping in the time domain with a second HARQ-ACK feedback scheduled by a second downlink grant.

Aspect 11 is the method of any of aspects 1 to 10, further including that multiplexing of each repetition is based on a rate-matching.

Aspect 12 is the method of any of aspects 1 to 11, further including: receiving a second uplink grant scheduling a second uplink transmission associated with a second repetition quantity, the second uplink grant including a second bit indicator; transmitting a second uplink transmission repetition, the second uplink transmission repetition and second HARQ-ACK feedback scheduled by a second downlink grant overlapping in the time domain; and skipping multiplexing of a second quantity of bits of the second HARQ-ACK feedback when a value of the second bit indicator is less than a threshold Aspect 13 is the method of any of aspects 1 to 12, further including that the threshold is two bits.

Aspect 14 is the method of any of aspects 1 to 13, further including that the downlink grant includes a downlink bit indicator and the quantity of the HARQ-ACK feedback bits being a same quantity as the bit indicator when the bit indicator is greater than or equal to the downlink bit indicator.

Aspect 15 is the method of any of aspects 1 to 14, further including that the quantity of the HARQ-ACK feedback bits being based on a relationship between the bit indicator and the downlink bit indicator when the downlink bit indicator is greater than the bit indicator.

Aspect 16 is the method of any of aspects 1 to 15, further including that the uplink grant includes an indication of the repetition quantity.

Aspect 17 is the method of any of aspects 1 to 16, further including: receiving an indication of the repetition quantity via radio resource control (RRC) signaling.

Aspect 18 is an apparatus for wireless communication at a UE including at least one processor coupled to a memory and configured to implement any of aspects 1 to 17.

In aspect 19, the apparatus of aspect 18 further includes at least one antenna coupled to the at least one processor.

In aspect 20, the apparatus of aspect 18 or 19 further includes a transceiver coupled to the at least one processor.

Aspect 21 is an apparatus for wireless communication including means for implementing any of aspects 1 to 17.

In aspect 22, the apparatus of aspect 21 further includes at least one antenna coupled to the means to perform the method of any of aspects 1 to 17.

In aspect 23, the apparatus of aspect 21 or 22 further includes a transceiver coupled to the means to perform the method of any of aspects 1 to 17.

Aspect 24 is a non-transitory computer-readable storage medium storing computer executable code, where the code, when executed, causes a processor to implement any of aspects 1 to 17.

Aspect 25 is a method of wireless communication at a network node, comprising: outputting an uplink grant scheduling an uplink transmission associated with a repetition quantity at a user equipment (UE), the uplink grant including a bit indicator; and obtaining a first repetition of the uplink transmission, the first repetition multiplexing a quantity of Hybrid Automatic Repeat Request (HARD) acknowledgement (HARQ-ACK) feedback bits of HARQ-ACK feedback for a physical downlink shared channel (PDSCH) scheduled by a downlink grant, the first repetition and the HARQ-ACK feedback overlapping in a time domain, the quantity of the HARQ-ACK feedback bits being based on the bit indicator.

Aspect 26 is the method of aspect 25, further including that the bit indicator is a first bit indicator of a bit indicator set including a number of bit indicators, the repetition quantity and the number of bit indicators being a same quantity.

Aspect 27 is the method of any of aspects 25 and 26, further including that each repetition of the uplink transmission is multiplexed by a bit quantity of the HARQ-ACK feedback bits associated with a respective bit indicator of the bit indicator set.

Aspect 28 is the method of any of aspects 25 to 27, further including that multiplexing of each repetition is based on a rate-matching.

Aspect 29 is the method of any of aspects 25 to 28, further including that each repetition of the uplink transmission is multiplexed by the quantity of the HARQ-ACK feedback bits indicated by the bit indicator.

Aspect 30 is the method of any of aspects 25 to 29, further including that a second repetition of the uplink transmission is non-overlapping in the time domain with second HARQ-ACK feedback scheduled by a second downlink grant.

Aspect 31 is the method of any of aspects 25 to 30, further including that multiplexing of each repetition is based on a rate-matching.

Aspect 32 is the method of any of aspects 25 to 31, further including that each repetition of the uplink transmission is multiplexed by the quantity of the HARQ-ACK feedback bits indicated by the bit indicator when a value of the bit indicator is greater than a threshold.

Aspect 33 is the method of any of aspects 25 to 32, further including that the threshold is two bits.

Aspect 34 is the method of any of aspects 25 to 33, further including that a second repetition of the uplink transmission is non-overlapping in the time domain with a second HARQ-ACK feedback scheduled by a second downlink grant.

Aspect 35 is the method of any of aspects 25 to 34, further including that multiplexing of each repetition is based on a rate-matching.

Aspect 36 is the method of any of aspects 25 to 35, further including: outputting a second uplink grant scheduling a second uplink transmission associated with a second repetition quantity, the second uplink grant including a second bit indicator; and obtaining a second uplink transmission repetition, the second uplink transmission and second HARQ-ACK feedback scheduled by a second downlink grant overlapping in the time domain, wherein the second uplink transmission repetition excludes multiplexing of a second quantity of bits of the second HARQ-ACK feedback when a value of the second bit indicator is less than a threshold.

Aspect 37 is the method of any of aspects 25 to 36, further including that the threshold is two bits.

Aspect 38 is the method of any of aspects 25 to 37, further including that the downlink grant includes a downlink bit indicator and the quantity of the HARQ-ACK feedback bits being a same quantity as the bit indicator when the bit indicator is greater than or equal to the downlink bit indicator.

Aspect 39 is the method of any of aspects 25 to 38, further including that the quantity of the HARQ-ACK feedback bits being based on a relationship between the bit indicator and the downlink bit indicator when the downlink bit indicator is greater than the bit indicator.

Aspect 40 is the method of any of aspects 25 to 39, further including that the uplink grant includes an indication of the repetition quantity.

Aspect 41 is the method of any of aspects 25 to 40, further including: outputting an indication of the repetition quantity via radio resource control (RRC) signaling.

Aspect 42 is an apparatus for wireless communication at a network node including at least one processor coupled to a memory and configured to implement any of aspects 25 to 41.

In aspect 43, the apparatus of aspect 42 further includes at least one antenna coupled to the at least one processor.

In aspect 44, the apparatus of aspect 42 or 43 further includes a transceiver coupled to the at least one processor.

Aspect 45 is an apparatus for wireless communication including means for implementing any of aspects 25 to 41.

In aspect 46, the apparatus of aspect 45 further includes at least one antenna coupled to the means to perform the method of any of aspects 25 to 41.

In aspect 47, the apparatus of aspect 45 or 46 further includes a transceiver coupled to the means to perform the method of any of aspects 25 to 41.

Aspect 48 is a non-transitory computer-readable storage medium storing computer executable code, where the code, when executed, causes a processor to implement any of aspects 25 to 41.

What is claimed is:

1. An apparatus for wireless communication at a user equipment (UE), comprising:
   memory; and
   at least one processor coupled to the memory and, based at least in part on information stored in the memory, the at least one processor is configured to:
      receive an uplink grant scheduling an uplink transmission associated with a repetition quantity, the uplink grant including a bit indicator set including a number of bit indicators that has a same quantity as the repetition quantity;
      multiplex each repetition of the uplink transmission by a bit quantity of Hybrid Automatic Repeat Request (HARQ) acknowledgement (HARQ-ACK) feedback bits associated with a respective bit indicator of the bit indicator set; and
      transmit a first repetition of the uplink transmission, the first repetition multiplexing a quantity of HARQ-ACK feedback bits of HARQ-ACK feedback for a physical downlink shared channel (PDSCH) scheduled by a downlink grant, the first repetition and the HARQ-ACK feedback overlapping in a time domain, wherein the quantity of the HARQ-ACK feedback bits are based on a first bit indicator of the bit indicator set.

2. The apparatus of claim 1, wherein the at least one processor is further configured to:
   transmit each repetition of the uplink transmission, wherein each repetition includes a respective by a bit quantity of the HARQ-ACK feedback bits associated with the respective bit indicator of the bit indicator set.

3. The apparatus of claim 1, wherein the downlink grant includes a downlink bit indicator and the quantity of the HARQ-ACK feedback bits is the same quantity as the first bit indicator when the first bit indicator is greater than or equal to the downlink bit indicator.

4. The apparatus of claim 3, wherein the quantity of the HARQ-ACK feedback bits is based on a relationship between the first bit indicator and the downlink bit indicator when the downlink bit indicator is greater than the first bit indicator.

5. The apparatus of claim 1, further comprising a transceiver coupled to the at least one processor.

6. An apparatus for wireless communication at a user equipment (UE), comprising:
memory; and
at least one processor coupled to the memory and, based at least in part on information stored in the memory, the at least one processor is configured to:
receive an uplink grant scheduling an uplink transmission associated with a repetition quantity, the uplink grant including a bit indicator;
multiplex each repetition of the uplink transmission by a quantity of Hybrid Automatic Repeat Request (HARQ) acknowledgement (HARQ-ACK) feedback bits indicated by the bit indicator; and
transmit repetitions of the uplink transmission, each repetition multiplexing the quantity of feedback bits of HARQ-ACK feedback for a physical downlink shared channel (PDSCH) scheduled by a downlink grant, wherein a first repetition and the HARQ-ACK feedback overlapping in a time domain, and wherein the quantity of the HARQ-ACK feedback bits is based on the bit indicator.

7. The apparatus of claim 6, wherein a second repetition of the uplink transmission is non-overlapping in the time domain with second HARQ-ACK feedback scheduled by a second downlink grant.

8. The apparatus of claim 6, wherein, to multiplex each repetition of the uplink transmission, the at least one processor is further configured to:
multiplex each repetition of the uplink transmission by the quantity of the HARQ-ACK feedback bits indicated by the bit indicator based on a value of the bit indicator that is greater than a threshold.

9. The apparatus of claim 8, wherein the threshold is two bits.

10. The apparatus of claim 8, wherein a second repetition of the uplink transmission is non-overlapping in the time domain with a second HARQ-ACK feedback scheduled by a second downlink grant.

11. The apparatus of claim 8, wherein the at least one processor is further configured to:
receive a second uplink grant scheduling a second uplink transmission associated with a second repetition quantity, the second uplink grant including a second bit indicator;
transmit a second uplink transmission repetition, the second uplink transmission repetition and second HARQ-ACK feedback scheduled by a second downlink grant overlapping in the time domain; and
skip multiplexing of a second quantity of bits of the second HARQ-ACK feedback when a value of the second bit indicator is less than the threshold.

12. The apparatus of claim 6, wherein the downlink grant includes a downlink bit indicator and the quantity of the HARQ-ACK feedback bits is a same quantity as the bit indicator when the bit indicator is greater than or equal to the downlink bit indicator.

13. A method of wireless communication at a user equipment (UE), comprising:
receiving an uplink grant scheduling an uplink transmission associated with a repetition quantity, the uplink grant including a bit indicator set including a number of bit indicators that has a same quantity as the repetition quantity;
multiplexing each repetition of the uplink transmission by a bit quantity of Hybrid Automatic Repeat Request (HARQ) acknowledgement (HARQ-ACK) feedback bits associated with a respective bit indicator of the bit indicator set; and
transmitting a first repetition of the uplink transmission, the first repetition multiplexing a quantity of HARQ-ACK feedback bits of HARQ-ACK feedback for a physical downlink shared channel (PDSCH) scheduled by a downlink grant, the first repetition and the HARQ-ACK feedback overlapping in a time domain, wherein the quantity of the HARQ-ACK feedback bits is based on a first bit indicator of the bit indicator set.

14. The method of claim 13, further comprising:
transmitting each repetition of the uplink transmission, wherein each repetition includes a respective by a bit quantity of the HARQ-ACK feedback bits associated with the respective bit indicator of the bit indicator set.

15. A method of wireless communication at a user equipment (UE), comprising:
receiving an uplink grant scheduling an uplink transmission associated with a repetition quantity, the uplink grant including a bit indicator;
multiplexing each repetition of the uplink transmission by a quantity of Hybrid Automatic Repeat Request (HARQ) acknowledgement (HARQ-ACK) feedback bits indicated by the bit indicator; and
transmitting repetitions of the uplink transmission, each repetition multiplexing the quantity of feedback bits of HARQ-ACK feedback for a physical downlink shared channel (PDSCH) scheduled by a downlink grant, wherein a first repetition and the HARQ-ACK feedback overlapping in a time domain, and wherein the quantity of the HARQ-ACK feedback bits is based on the bit indicator.

16. The method of claim 15, wherein the multiplexing each repetition of the uplink transmission by the quantity of the HARQ-ACK feedback bits indicated by the bit indicator is based on a value of the bit indicator that is greater than a threshold.

17. The method of claim 16, further comprising:
receiving a second uplink grant scheduling a second uplink transmission associated with a second repetition quantity, the second uplink grant including a second bit indicator;
transmitting a second uplink transmission repetition, the second uplink transmission repetition and second HARQ-ACK feedback scheduled by a second downlink grant overlapping in the time domain; and
skipping multiplexing of a second quantity of bits of the second HARQ-ACK feedback when a value of the second bit indicator is less than the threshold.

18. The method of claim 15, wherein the downlink grant includes a downlink bit indicator and the quantity of the HARQ-ACK feedback bits is a same quantity as the bit indicator when the bit indicator is greater than or equal to the downlink bit indicator.

19. A method of wireless communication at a network node, comprising:
transmitting an uplink grant scheduling an uplink transmission associated with a repetition quantity at a user equipment (UE), the uplink grant including a bit indicator set including a number of bit indicators that has a same quantity as the repetition quantity; and receiving a first repetition of the uplink transmission, the first repetition multiplexing a quantity of Hybrid Automatic Repeat Request (HARQ) acknowledgement (HARQ-ACK) feedback bits of HARQ-ACK feedback for a physical downlink shared channel (PDSCH) scheduled by a downlink grant, wherein the first repetition and the HARQ-ACK feedback overlapping in a time domain, and wherein the quantity of the HARQ-ACK feedback bits is based on a first bit indicator of the bit indicator set.

20. The method of claim 19, further comprising:
transmitting a second uplink grant scheduling a second uplink transmission associated with a second repetition quantity, the second uplink grant including a second bit indicator; and
receiving a second uplink transmission repetition, the second uplink transmission and second HARQ-ACK feedback scheduled by a second downlink grant overlapping in the time domain, wherein the second uplink transmission repetition excludes multiplexing of a second quantity of bits of the second HARQ-ACK feedback when a value of the second bit indicator is less than a threshold.

21. The method of claim 19, wherein the downlink grant includes a downlink bit indicator and the quantity of the HARQ-ACK feedback bits is the same quantity as the first bit indicator when the first bit indicator is greater than or equal to the downlink bit indicator.

22. The method of claim 21, wherein the quantity of the HARQ-ACK feedback bits is based on a relationship between the first bit indicator and the downlink bit indicator when the downlink bit indicator is greater than the first bit indicator.

23. A method of wireless communication at a network node, comprising:
transmitting an uplink grant scheduling an uplink transmission associated with a repetition quantity at a user equipment (UE), the uplink grant including a bit indicator; and
receiving a first repetition of the uplink transmission, the first repetition multiplexing a quantity of Hybrid Automatic Repeat Request (HARQ) acknowledgement (HARQ-ACK) feedback bits of HARQ-ACK feedback for a physical downlink shared channel (PDSCH) scheduled by a downlink grant, the first repetition and the HARQ-ACK feedback overlapping in a time domain, the quantity of the HARQ-ACK feedback bits being based on the bit indicator, wherein each repetition of the uplink transmission is multiplexed by the quantity of the HARQ-ACK feedback bits indicated by the bit indicator.

24. An apparatus for wireless communication at a network node, comprising:
memory; and
at least one processor coupled to the memory and, based at least in part on information stored in the memory, the at least one processor is configured to:
transmit an uplink grant scheduling an uplink transmission associated with a repetition quantity at a user equipment (UE), the uplink grant including a bit indicator set including a number of bit indicators that has a same quantity as the repetition quantity; and
receive a first repetition of the uplink transmission, wherein the first repetition multiplexes a quantity of Hybrid Automatic Repeat Request (HARQ) acknowledgement (HARQ-ACK) feedback bits of HARQ-ACK feedback for a physical downlink shared channel (PDSCH) scheduled by a downlink grant, wherein the first repetition and the HARQ-ACK feedback overlap in a time domain, and wherein the quantity of the HARQ-ACK feedback bits is based on a first bit indicator of the bit indicator set.

25. The apparatus of claim 24, wherein the downlink grant includes a downlink bit indicator and the quantity of the HARQ-ACK feedback bits is the same quantity as the first bit indicator when the first bit indicator is greater than or equal to the downlink bit indicator.

26. The apparatus of claim 24, further comprising a transceiver coupled to the at least one processor.

27. An apparatus for wireless communication at a network node, comprising:
a memory; and
at least one processor coupled to the memory and, based at least in part on information stored in the memory, the at least one processor is configured to:
transmit an uplink grant scheduling an uplink transmission associated with a repetition quantity at a user equipment (UE), the uplink grant including a bit indicator;
and
receive a first repetition of the uplink transmission, the first repetition multiplexing a quantity of Hybrid Automatic Repeat Request (HARQ) acknowledgement (HARQ-ACK) feedback bits of HARQ-ACK feedback for a physical downlink shared channel (PDSCH) scheduled by a downlink grant, the first repetition and the HARQ-ACK feedback overlapping in a time domain, the quantity of the HARQ-ACK feedback bits being based on the bit indicator, wherein each repetition of the uplink transmission is multiplexed by the quantity of the HARQ-ACK feedback bits indicated by the bit indicator.

28. The apparatus of claim 27, wherein the at least one processor is further configured to:
transmit a second uplink grant scheduling a second uplink transmission associated with a second repetition quantity, the second uplink grant including a second bit indicator; and
receive a second uplink transmission repetition, the second uplink transmission and second HARQ-ACK feedback scheduled by a second downlink grant overlapping in the time domain, wherein the second uplink transmission repetition excludes multiplexing of a second quantity of bits of the second HARQ-ACK feedback when a value of the second bit indicator is less than a threshold.

* * * * *